US012123372B2

(12) United States Patent
Stone et al.

(10) Patent No.: US 12,123,372 B2
(45) Date of Patent: Oct. 22, 2024

(54) TWO SERVOVALVE THRUST REVERSER ACTUATOR SYSTEM

(71) Applicant: Woodward, Inc., Fort Collins, CO (US)

(72) Inventors: William Ernest Stone, Upland, CA (US); Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/175,102

(22) Filed: Feb. 27, 2023

(65) Prior Publication Data

US 2024/0287948 A1    Aug. 29, 2024

(51) Int. Cl.
*F02K 1/76* (2006.01)
*F02K 1/62* (2006.01)

(52) U.S. Cl.
CPC ............ *F02K 1/763* (2013.01); *F02K 1/62* (2013.01); *F02K 1/766* (2013.01); *F05D 2220/323* (2013.01); *F05D 2270/56* (2013.01); *F05D 2270/64* (2013.01)

(58) Field of Classification Search
CPC ... F02K 1/763; F02K 1/60; F02K 1/62; F05D 2260/50; F05D 2270/64
See application file for complete search history.

(56) References Cited

U.S. PATENT DOCUMENTS

| 4,391,409 | A | 7/1983 | Scholz |
| 4,797,831 | A | 1/1989 | Dressing et al. |
| 5,415,076 | A * | 5/1995 | Krone ................... F15B 11/044 91/440 |
| 8,170,771 | B2 * | 5/2012 | Calmelat ................... F02K 1/76 701/100 |
| 10,227,951 | B2 | 3/2019 | Kopecek |
| 2015/0090810 | A1 | 4/2015 | Lallement et al. |
| 2018/0298924 | A1 | 10/2018 | Le Coq |
| 2022/0364526 | A1 | 11/2022 | Kopecek |

OTHER PUBLICATIONS

U.S. Appl. No. 18/175,120, Brandt, filed Feb. 27, 2023.
International Search Report and Written Opinion in International Application No. PCT/US2024/017513, mailed on Jun. 11, 2024, 15 pages.

* cited by examiner

*Primary Examiner* — Andrew H Nguyen
(74) *Attorney, Agent, or Firm* — Fish & Richardson P.C.

(57) ABSTRACT

The subject matter of this specification can be embodied in, among other things, an engine assembly having a nacelle surrounding an engine, and a thrust reverser coupled to the nacelle and having a thrust-reversing element movable relative to the nacelle between a stowed and deployed position, a first hydraulic actuator configured to move the thrust-reversing element between the stowed position and deployed position, the first hydraulic actuator being connected to a fluid source and a return reservoir, and a second hydraulic actuator configured to move the thrust-reversing element between the stowed and deployed position, the second hydraulic actuator being connected to the fluid source and the return reservoir, and a control system having an electrohydraulic servo valve operable to selectively route fluid between the fluid source, the second hydraulic actuator, and the return reservoir, and a controller configured to operate the electrohydraulic servo valve.

17 Claims, 16 Drawing Sheets

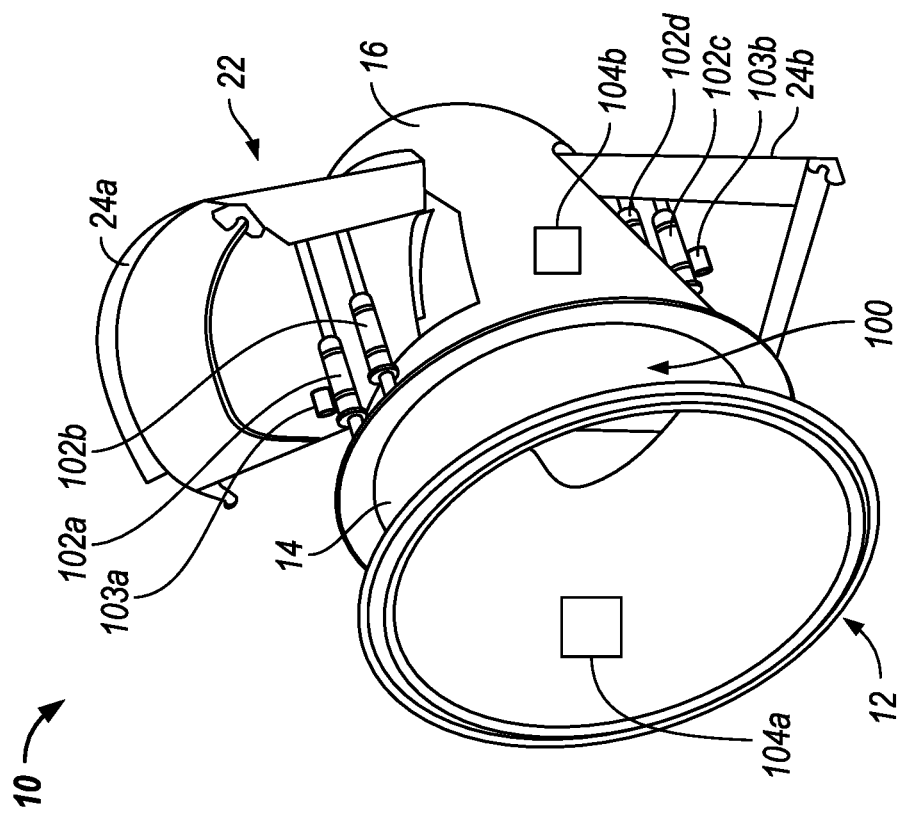
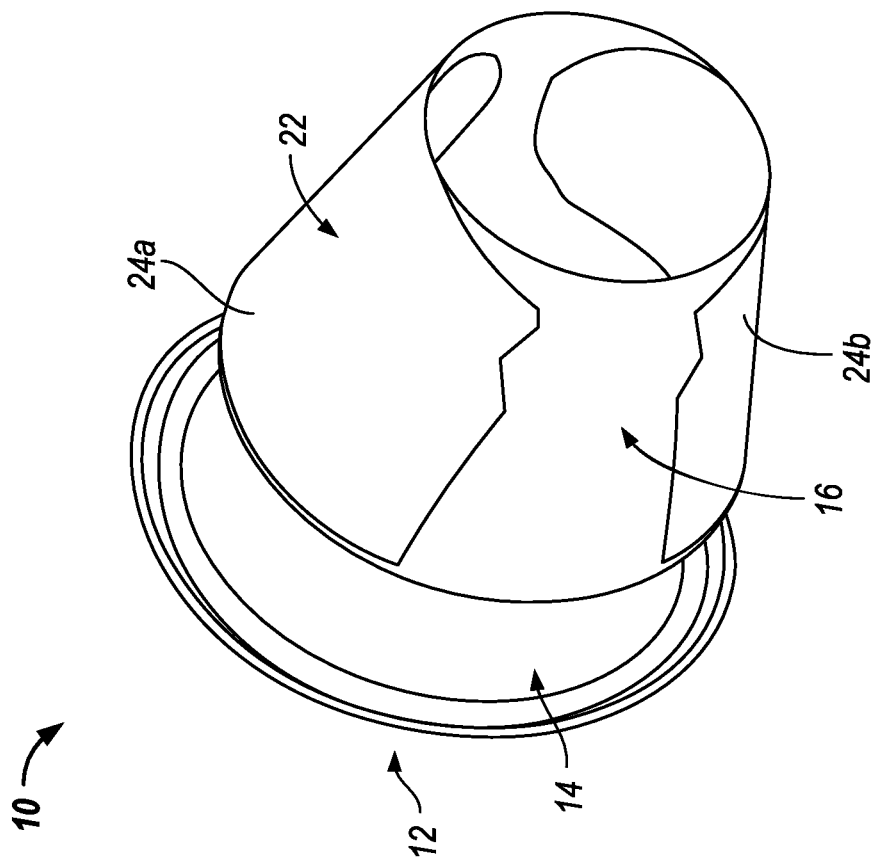

TWO SERVOVALVE THRUST REVERSER ACTUATOR SYSTEM

TECHNICAL FIELD

This specification generally relates to thrust reversers for jet aircraft engine assemblies.

BACKGROUND

Thrust reversers are commonly incorporated in aircraft turbine engines. The role of the thrust reverser is to improve the braking capability of the aircraft upon landing by redirecting fluid flow through the engine to provide a counterthrust opposing the direction of travel. Conventional thrust reverser actuation systems (TRAS) typically use multiple moveable reverser elements, each of which is actuated by two or more actuators. Mechanical synchronization devices (i.e., synchronization shafts or cables) are commonly used to interlink the actuators mechanically in order to synchronize movements of the actuators; however, such mechanical solutions can be space-intensive and/or heavy.

Solutions exist in which electrohydraulic servo valves (EHSVs) are used to control and synchronize multiple actuators. However, existing EHSV-type TRAS require a costly EHSV to be associated with each actuator.

SUMMARY

In general, this document describes thrust reversers for jet aircraft engine assemblies. In a general example, an engine assembly includes a nacelle configured to at least partially surround an engine, and a thrust reverser coupled to the nacelle, the thrust reverser having a thrust-reversing element movable relative to the nacelle between a stowed position and a deployed position, a first hydraulic actuator operably coupled to move the thrust-reversing element between the stowed position and the deployed position, the first hydraulic actuator being fluidically connected to a pressurized fluid source and a fluid return reservoir, and a second hydraulic actuator operably coupled to move the thrust-reversing element between the stowed position and the deployed position, the second hydraulic actuator being fluidically connected to the pressurized fluid source and the fluid return reservoir, and a fluid control system having an electrohydraulic servo valve operable to selectively route fluid between the pressurized fluid source, the second hydraulic actuator, and the fluid return reservoir, and a controller configured to operate the electrohydraulic servo valve.

Various embodiments can include some, all, or none of the following features. The controller can be configured to operate the electrohydraulic servo valve such that a second mechanical output of the second hydraulic actuator is urged toward positional synchronicity with a first mechanical output of the first hydraulic actuator. The engine assembly can include a second electrohydraulic servo valve operable to selectively route fluid between a pressurized fluid source, the first hydraulic actuator, the second hydraulic actuator, the electrohydraulic servo valve, and a fluid return reservoir. The fluid control system can include an isolation control unit including an isolation control valve operable to selectively inhibit or permit fluid flow between the second electrohydraulic servo valve, the pressurized fluid source, and the fluid return reservoir. The first hydraulic actuator, the second hydraulic actuator, and the electrohydraulic servo valve can be fluidically connected in parallel between the pressurized fluid source and the fluid return reservoir. The fluid control system can include a first anti-cavitation check valve residing on a first return fluid line in fluidic communication with the fluid return reservoir, the first anti-cavitation check valve configured to permit fluid flow from the fluid return reservoir to the first hydraulic actuator, while inhibiting fluid flow from the first hydraulic actuator to the fluid return reservoir, and a second anti-cavitation check valve residing on a second return fluid line in fluidic communication with the fluid return reservoir, the second anti-cavitation check valve configured to permit fluid flow from the fluid return reservoir to the second hydraulic actuator, while inhibiting fluid flow from the second hydraulic actuator to the fluid return reservoir. The engine assembly can include a first position sensor configured to provide a first position feedback signal representative of a position of a first mechanical output of the first hydraulic actuator, wherein the controller is configured to operate the electrohydraulic servo valve based on the first position feedback signal. The engine assembly can include a second position sensor configured to provide a second position feedback signal representative of a position of a second mechanical output of the second hydraulic actuator, wherein the controller is configured to operate the electrohydraulic servo valve based on the first position feedback signal and the second position feedback signal.

In another general example, a fluid control system configured to operate a first hydraulic actuator coupled to a thrust-reversing element coupled to a nacelle of an engine assembly and a second hydraulic actuator coupled to the thrust-reversing element, the fluid control system including an electrohydraulic servo valve operable to selectively route fluid between a pressurized fluid source, the second hydraulic actuator, and a fluid return reservoir, and a controller configured to operate the electrohydraulic servo valve, wherein the first hydraulic actuator, the second hydraulic actuator, and the electrohydraulic servo valve are fluidically connected to the pressurized fluid source and the fluid return reservoir.

Various embodiments can include some, all, or none of the following features. The controller can be configured to operate the electrohydraulic servo valve such that a second mechanical output of the second hydraulic actuator is urged toward positional synchronicity with a first mechanical output of the first hydraulic actuator. The fluid control system can include a second electrohydraulic servo valve operable to selectively route fluid between the pressurized fluid source, the first hydraulic actuator, the second hydraulic actuator, the electrohydraulic servo valve, and the fluid return reservoir. The fluid control system can include an isolation control unit including an isolation control valve operable to selectively inhibit or permit fluid flow between the second electrohydraulic servo valve, the pressurized fluid source, and the fluid return reservoir. The first hydraulic actuator, the second hydraulic actuator, and the electrohydraulic servo valve can be fluidically connected in parallel between the pressurized fluid source and the fluid return reservoir. The engine assembly can include a first anti-cavitation check valve residing on a first return fluid line in fluidic communication with the fluid return reservoir, the first anti-cavitation check valve configured to permit fluid flow from the fluid return reservoir to the first hydraulic actuator, while inhibiting fluid flow from the first hydraulic actuator to the fluid return reservoir, and a second anti-cavitation check valve residing on a second return fluid line in fluidic communication with the fluid return reservoir, the second anti-cavitation check valve configured to permit fluid flow from the fluid return reservoir to the second hydraulic actuator, while inhibiting fluid flow from the second hydraulic actuator to the fluid return reservoir. The fluid control system can include a first position sensor configured to provide a first position feedback signal representative of a position of a first mechanical output of the first hydraulic actuator, wherein the controller is configured to operate the electrohydraulic servo valve based on the first position feedback signal. The fluid control system can include a second position sensor configured to provide a second position feedback signal representative of a position of a second mechanical output of the second hydraulic actuator, wherein the controller is configured to operate the electrohydraulic servo valve based on the first position feedback signal and the second position feedback signal.

In another general example, a method of operating an engine thrust reverser comprising a thrust-reversing element movable between a stowed position and a deployed position, the method including transitioning the thrust-reversing element from the stowed position to the deployed position by conveying fluid from a pressurized fluid source to a first hydraulic actuator coupled to the thrust-reversing element, conveying fluid from the pressurized fluid source to a second hydraulic actuator coupled to the thrust-reversing element, conveying fluid from the pressurized fluid source to an electrohydraulic servo valve operable to selectively route fluid between the pressurized fluid source, the second hydraulic actuator, and a fluid return reservoir, and controlling, by a controller, operation of the electrohydraulic servo valve.

Various implementations can include some, all, or none of the following features. The method can include controlling, by the controller, operation of the electrohydraulic servo valve such that a second mechanical output of the second hydraulic actuator is urged toward positional synchronicity with a first mechanical output of the first hydraulic actuator. The method can include selectively routing, by a second electrohydraulic servo valve, fluid between the pressurized fluid source, the first hydraulic actuator, the second hydraulic actuator, the electrohydraulic servo valve, and the fluid return reservoir. The first hydraulic actuator, the second hydraulic actuator, and the electrohydraulic servo valve can be fluidically connected in parallel between the pressurized fluid source and the fluid return reservoir. The method can include operating an isolation control unit including an isolation control valve to selectively inhibit or permit fluid flow between the electrohydraulic servo valve, the pressurized fluid source, and the fluid return reservoir. Conveying fluid from the pressurized fluid source to the electrohydraulic servo valve can include conveying fluid from the pressurized fluid source to the electrohydraulic servo valve in parallel with conveying fluid from the pressurized fluid source to the first hydraulic actuator, wherein the first hydraulic actuator and the electrohydraulic servo valve are fluidically connected in parallel between the pressurized fluid source and the fluid return reservoir. The method can include permitting, by a first anti-cavitation check valve residing on a first bypass fluid line providing fluid communication between the first hydraulic actuator and the fluid return reservoir independent of the electrohydraulic servo valve, fluid flow from the fluid return reservoir to the first hydraulic actuator, inhibiting, by the first anti-cavitation check valve, fluid flow from the first hydraulic actuator to the fluid return reservoir, permitting, by a second anti-cavitation check valve residing on a second bypass fluid line providing fluid communication between the second hydraulic actuator and the fluid return reservoir independent of the electrohydraulic servo valve, fluid flow from the fluid return reservoir to the second hydraulic actuator, and inhibiting, by the second anti-cavitation check valve, fluid flow from the second hydraulic actuator to the fluid return reservoir.

In another general example, an engine assembly includes a nacelle configured to at least partially surround an engine, and a thrust reverser coupled to the nacelle, the thrust reverser having a first thrust-reversing element movable relative to the nacelle between a first stowed position and a first deployed position, a first hydraulic actuator operably coupled to move the first thrust-reversing element between the first stowed position and the first deployed position, the first hydraulic actuator being fluidically connected to a pressurized fluid source and a fluid return reservoir, and a second thrust-reversing element movable relative to the nacelle between a second stowed position and a second deployed position, a second hydraulic actuator operably coupled to move the second thrust-reversing element between the second stowed position and the second deployed position, the second hydraulic actuator being fluidically connected to the pressurized fluid source and the fluid return reservoir, and a fluid control system having an electrohydraulic servo valve operable to selectively route fluid between the pressurized fluid source, the first hydraulic actuator, and the fluid return reservoir, and a controller configured to operate the electrohydraulic servo valve.

Various embodiments can include some, all, or none of the following features. The controller can be configured to operate the electrohydraulic servo valve such that a first mechanical output of the first hydraulic actuator is urged toward positional synchronicity with a second mechanical output of the second hydraulic actuator. The engine assembly can include a second electrohydraulic servo valve operable to selectively route fluid between a pressurized fluid source, the first hydraulic actuator, the second hydraulic actuator, the electrohydraulic servo valve, and a fluid return reservoir. The fluid control system can include an isolation control unit including an isolation control valve operable to selectively inhibit or permit fluid flow between the second electrohydraulic servo valve, the pressurized fluid source, and the fluid return reservoir. The thrust reverser can include a third hydraulic actuator operably coupled to move the first thrust-reversing element between the first stowed position and the first deployed position, the third hydraulic actuator being fluidically connected to a pressurized fluid source and a fluid return reservoir, and the fluid control system can include another electrohydraulic servo valve operable to selectively route fluid between the pressurized fluid source, the third hydraulic actuator, and the fluid return reservoir, and another controller configured to operate the other electrohydraulic servo valve. The first hydraulic actuator, the second hydraulic actuator, and the electrohydraulic servo valve can be fluidically connected in parallel between the pressurized fluid source and the fluid return reservoir. The fluid control system can include an anti-cavitation check valve residing on a return fluid line in fluidic communication with the fluid return reservoir, the anti-cavitation check valve configured to permit fluid flow from the fluid return reservoir to at least one of the first hydraulic actuator and the second hydraulic actuator, while inhibiting fluid flow from the at least one of the first hydraulic actuator and the second hydraulic actuator to the fluid return reservoir. The engine assembly can include a first position sensor configured to provide a first position feedback signal representative of a position of a first mechanical output of the first hydraulic actuator, wherein the controller is configured to operate the electrohydraulic servo valve based on the first position feedback signal, and a second position sensor configured to provide a second position feedback signal representative of a position of a second mechanical output of the second hydraulic actuator, wherein the controller is configured to operate the electrohydraulic servo valve based on the first position feedback signal and the second position feedback signal.

In another example embodiment, a fluid control system is configured to operate a first hydraulic actuator coupled to a first thrust-reversing element coupled to a nacelle of an engine assembly and a second hydraulic actuator coupled to a second thrust-reversing element coupled to the nacelle of the engine assembly, the fluid control system including an electrohydraulic servo valve operable to selectively route fluid between a pressurized fluid source, the first hydraulic actuator, and a fluid return reservoir, and a controller configured to operate the electrohydraulic servo valve, wherein the first hydraulic actuator, the second hydraulic actuator, and the electrohydraulic servo valve are fluidically connected to the pressurized fluid source and the fluid return reservoir.

Various embodiments can include some, all, or none of the following features. The controller can be configured to operate the electrohydraulic servo valve such that a first mechanical output of the first hydraulic actuator is urged toward positional synchronicity with a second mechanical output the second hydraulic actuator. The fluid control system can include a second electrohydraulic servo valve operable to selectively route fluid between the pressurized fluid source, the first hydraulic actuator, the second hydraulic actuator, the electrohydraulic servo valve, and the fluid return reservoir. The fluid control system can include an isolation control unit including an isolation control valve operable to selectively inhibit or permit fluid flow between the second electrohydraulic servo valve, the pressurized fluid source, and the fluid return reservoir. The fluid control system can include a third hydraulic actuator operably coupled to move the first thrust-reversing element between a stowed position and a deployed position, the third hydraulic actuator being fluidically connected to a pressurized fluid source and a fluid return reservoir, and the fluid control system can include another electrohydraulic servo valve operable to selectively route fluid between the pressurized fluid source, the third hydraulic actuator, and the fluid return reservoir, and another controller configured to operate the other electrohydraulic servo valve. The first hydraulic actuator, the second hydraulic actuator, and the electrohydraulic servo valve can be fluidically connected in parallel between the pressurized fluid source and the fluid return reservoir. The engine assembly can include an anti-cavitation check valve residing on a return fluid line in fluidic communication with the fluid return reservoir, the anti-cavitation check valve configured to permit fluid flow from the fluid return reservoir to at least one of the first hydraulic actuator and the second hydraulic actuator, while inhibiting fluid flow from the at least one of the first hydraulic actuator and the second hydraulic actuator to the fluid return reservoir. The fluid control system can include a first position sensor configured to provide a first position feedback signal representative of a position of a first mechanical output of the first hydraulic actuator, and a second position sensor configured to provide a second position feedback signal representative of a position of a second mechanical output of the second hydraulic actuator, wherein the controller is configured to operate the electrohydraulic servo valve based on the first position feedback signal and the second position feedback signal.

In another general example, a method of operating an engine thrust reverser includes a first thrust-reversing element movable between a first stowed position and a first deployed position and a second thrust-reversing element movable between a second stowed position and a second deployed position, the method including transitioning the first thrust-reversing element from the first stowed position to the first deployed position by conveying fluid from a pressurized fluid source to a first hydraulic actuator coupled to the first thrust-reversing element, transitioning the second thrust-reversing element from the second stowed position to the second deployed position by conveying fluid from the pressurized fluid source to a second hydraulic actuator coupled to the second thrust-reversing element, conveying fluid from the pressurized fluid source to an electrohydraulic servo valve operable to selectively route fluid between the pressurized fluid source, the first hydraulic actuator, and a fluid return reservoir, and controlling, by a controller, operation of the electrohydraulic servo valve.

Various implementations can include some, all, or none of the following features. The method can include controlling, by the controller, operation of the electrohydraulic servo valve such that a first mechanical output of the first hydraulic actuator is urged toward positional synchronicity with a second mechanical output the second hydraulic actuator. The method can include selectively routing, by a second electrohydraulic servo valve, fluid between the pressurized fluid source, the first hydraulic actuator, the second hydraulic actuator, the electrohydraulic servo valve, and the fluid return reservoir. The first hydraulic actuator, the second hydraulic actuator, and the electrohydraulic servo valve can be fluidically connected in parallel between the pressurized fluid source and the fluid return reservoir. The method can include operating an isolation control unit including an isolation control valve to selectively inhibit or permit fluid flow between the electrohydraulic servo valve, the pressurized fluid source, and the fluid return reservoir. Transitioning the first thrust-reversing element from the first stowed position to the first deployed position can include conveying fluid from a pressurized fluid source to a third hydraulic actuator coupled to the first thrust-reversing element, conveying fluid from the pressurized fluid source to another electrohydraulic servo valve operable to selectively route fluid between the pressurized fluid source, the third hydraulic actuator, and a fluid return reservoir, wherein conveying fluid from the pressurized fluid source to the other electrohydraulic servo valve can include conveying fluid from the pressurized fluid source to the other electrohydraulic servo valve in parallel with conveying fluid from the pressurized fluid source to the first hydraulic actuator, the second hydraulic actuator, the third hydraulic actuator, and the electrohydraulic servo valve, wherein the first hydraulic actuator, the second hydraulic actuator, the third hydraulic actuator, the electrohydraulic servo valve, and the other electrohydraulic servo valve are fluidically connected in parallel between the pressurized fluid source and the fluid return reservoir, and controlling, by another controller, operation of the other electrohydraulic servo valve such that a first mechanical output of the third hydraulic actuator is urged toward positional synchronicity with a second mechanical output the first hydraulic actuator. Conveying fluid from the pressurized fluid source to the electrohydraulic servo valve can include conveying fluid from the pressurized fluid source to the electrohydraulic servo valve in parallel with conveying fluid from the pressurized fluid source to the first hydraulic actuator and the second hydraulic actuator, wherein the first hydraulic actuator, the second hydraulic actuator, and the electrohydraulic servo valve are fluidically connected in parallel between the pressurized fluid source and the fluid return reservoir. The method can include permitting, by an anti-cavitation check valve residing on a bypass fluid line providing fluid communication between at least one of the first hydraulic actuator and the second hydraulic actuator and the fluid return reservoir independent of the electrohydraulic servo valve, fluid flow from the fluid return reservoir to the at least one of the first hydraulic actuator and the second hydraulic actuator, and inhibiting, by the anti-cavitation check valve, fluid flow from the at least one of the first hydraulic actuator and the second hydraulic actuator to the fluid return reservoir.

The systems and techniques described here may provide one or more of the following advantages. First, a system can provide synchronization between two or more actuators in a thrust reverser actuation system (TRAS). Second, the system can synchronize operation of two or more actuators connected to a shared structure and/or two or more actuators connected to two or more independently actuatable structures. Third, the system can substantially or entirely eliminate the weight and space of mechanical synchronization cables and/or shafts used to synchronize multiple TRAS actuators. Fourth, the system can reduce the number of electrohydraulic servo valves (EHSVs) used in EHSV-type TRAS systems. Fifth, the system can reduce the size of EHSVs used in EHSV-type TRAS systems.

The details of one or more implementations are set forth in the accompanying drawings and the description below. Other features and advantages will be apparent from the description and drawings, and from the claims.

DESCRIPTION OF DRAWINGS

FIG. 1A is a rear perspective view illustrating a portion of an example engine assembly with the elements of a thrust reverser in a stowed position.

FIG. 1B is a front perspective view illustrating the example engine assembly of FIG. 1A with the elements of the thrust reverser in a deployed position.

DETAILED DESCRIPTION

Figure 2A:
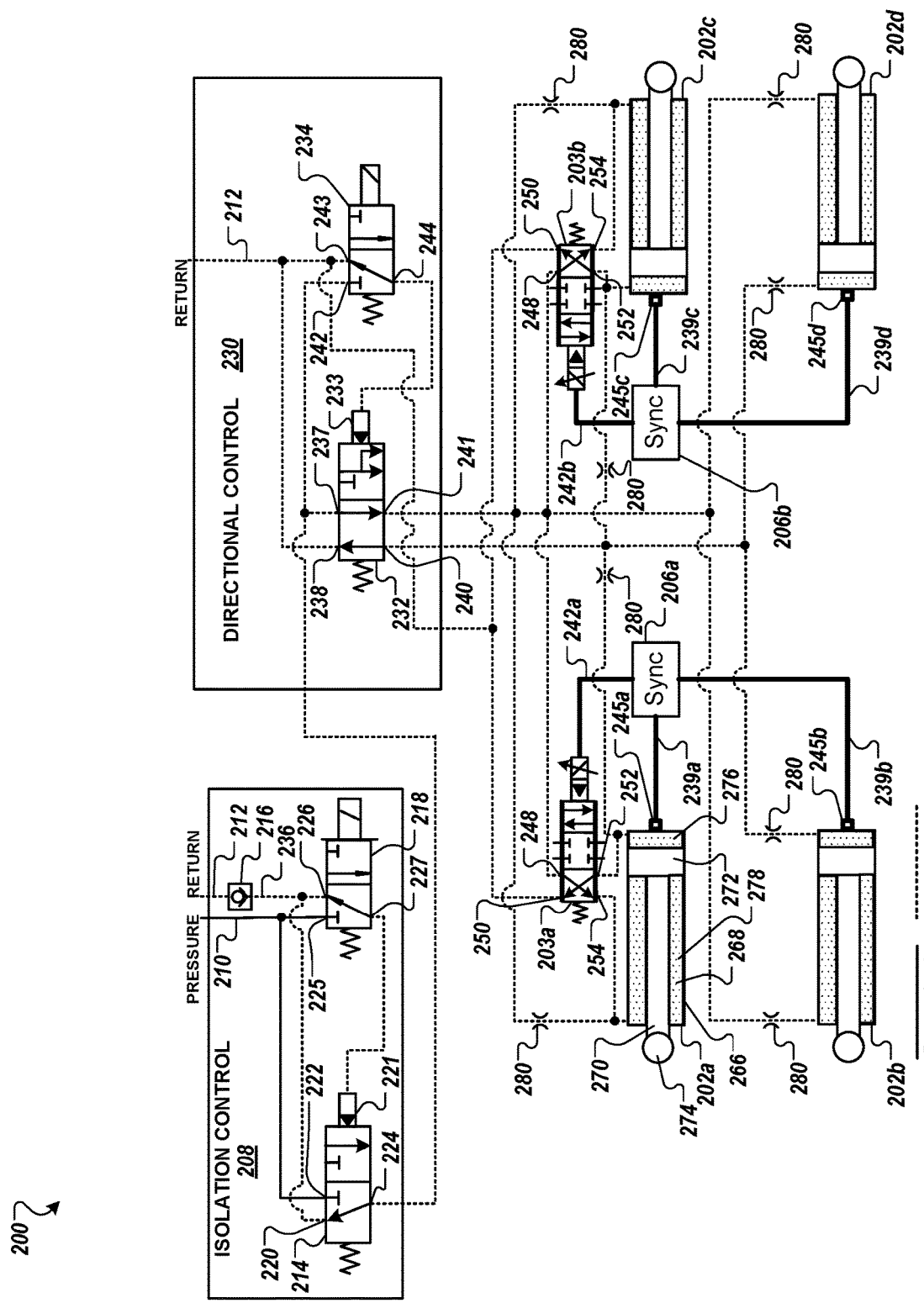
FIGS. 2A-2E are progressive diagrams illustrating operation of a first example thrust-reverser actuation system during deployment and stowing of the thrust reverser elements.

Various embodiments of the present disclosure are directed to thrust reverser actuation systems ("TRAS") that use a central directional control valve (DCV) to provide fluid control of multiple, parallel fluid (e.g., hydraulic) actuators, and use smaller electrohydraulic servo valves (EHSVs) to substantially synchronize the movements of the actuators. In general, a high-volume DCV can be used to provide coarse control of fluid flow (e.g., extend, retract), and the EHSVs can be used to provide fine, closed-loop control of portions of the fluid flow to boost or slow the movement of one or more of the actuators. In some embodiments, the use of closed-loop control of EHSVs can replace or eliminate the weight and space needed for the mechanical sync shafts or cables that are typically used to provide synchronization between two or more TRAS actuators.

FIGS. 1A and 1B illustrate an example engine assembly 10 in accordance with one or more embodiments of the present disclosure. In some embodiments, the engine assembly 10 may be incorporated in a powered vehicle (not shown), such as an aircraft. In this example, the engine assembly 10 includes a nacelle 12 supporting an engine thrust reverser 22. As shown, the nacelle 12 is an annular structure coupleable to the vehicle's frame for housing a turbine engine (e.g., a turbojet or turbofan engine) powering the vehicle. In this example, the nacelle 12 includes a front housing 14 and a rear housing 16. The front housing 14 and the rear housing 16 are tubular, frusto-conical components, with the rear housing 16 being mounted co-axially with the front housing 14. The front housing 14 is designed to receive the turbine engine, and the rear housing 16 is designed to support the thrust reverser 22. In this example, the thrust reverser 22 is a pivoting-door type arrangement, a clamshell configuration in particular. However, other suitable types of thrust reversers (e.g., cascade, target door or petal door type thrust reversers) may also be compatible with the actuation systems described herein.

The thrust reverser 22 includes a pair of thrust-reversing elements 24a and 24b and a thrust reverser actuation system (TRAS) 100 (shown schematically in FIG. 1B). The thrust-reversing elements 24a and 24b are shown in this example as bulkheads or "doors" pivotally mounted to the rear housing 16 of the nacelle 12. The elements 24a and 24b are shown in a stowed position, pivoted inward towards the nacelle 12, in FIGS. 1A and 1n a deployed position, pivoted outward away from the nacelle 12, in FIG. 1B. The TRAS 100 is appropriately configured to control operation of the elements 24a and 24b, regulating movement between the stowed and deployed positions, for example, based on one or more control signals. In this example, the TRAS 100 includes hydraulic actuators 102a, 102b, 102c, and 102d, electrohydraulic servo valves (EHSV) 103a and 103b, and hydraulic locks 104a and 104b. The hydraulic actuators 102a and 102b are operably coupled to move the element 24a between the stowed and deployed positions, and hydraulic actuators 102c and 102d are operably coupled to move the element 24b between the stowed and deployed positions. The hydraulic actuators 102a, 102b, 102c, and 102d are designed to provide linear movement, pushing the elements 24a and 24b outward from the stowed position to the deployed position and pulling the elements 24a and 24b inward from the deployed position to the stowed position. In this example, each of the hydraulic locks 104a and 104b are engageable with both of the elements 24a and 24b, such that either of the locks can independently prevent the unintentional deployment of both elements if the other lock becomes inoperable. The hydraulic locks 104a and 104b are configured to transition between an engaged state, where movement (e.g., deployment) of the elements 24a and 24b is inhibited, and a released state, where movement of the elements 24a and 24b is uninhibited. The EHSVs 103a and 103b are fluidically coupled to (or placed in fluid communication with) each of the hydraulic actuators 102a and 102c. The EHSVs 103a and 103b receive pressurized fluid from a fluid source and selectively port the fluid to the hydraulic actuators 102a and 102c to operate these components via hydraulic pressure.

Note that the term "fluidically coupled" is used in the present disclosure when referring to components that are capable of being placed in a condition, state, or stage where fluid communication between them is permitted. Further note that the terms "fluid communication" and "fluidically coupled" are used synonymously throughout the present disclosure.

FIGS. 2A-2E are progressive diagrams illustrating operation of an example thrust-reverser actuation system (TRAS) 200 during deployment and stowing of the thrust reverser elements. In some embodiments, the TRAS 200 can be the example TRAS 100 of FIGS. 1A-1B. The TRAS 200 may be used in conjunction with the example engine assembly 10 shown and described above with respect to FIGS. 1A and 1B. Thus, similar to the TRAS 100, the TRAS 200 includes first, second, third, and fourth actuators 202a-202d, first and second electrohydraulic servo valves (EHSVs) 203a, 203b, and first and second controllers 206a, 206b (the hydraulic locks are not shown in this example).

The TRAS 200 further includes an isolation control unit 208 ("ICU"), a fluid source 210, and a fluid return reservoir 212. The fluid source 210 may include one or more suitable pressure regulating apparatuses (e.g. a pump) for controlling (e.g., increasing) the pressure of a working fluid (e.g., a hydraulic fluid). The fluid return reservoir 212 may include one or more vessels for receiving working fluid passed through various components of the actuating system, containing the working fluid, and supplying the working fluid to the fluid source 210. The ICU 208 is configured to selectively permit and block the flow of fluid from the fluid source 210 to the rest of the TRAS 200.

In this example, the ICU 208 includes an isolation control valve 214 ("ICV"), a check valve 216 arranged along a return fluid line 236, and a solenoid valve 218 configured to concurrently control operation of the isolation control valve 214. The ICV 214 and the solenoid valve 218 are each fluidically coupled to the fluid source 210 and fluid return reservoir 212 by various fluid lines. The check valve 216 is fluidically coupled to the fluid return reservoir 212. As shown, with respect to the fluid return reservoir 212, the check valve 216 is located upstream of substantially all other functional components of the TRAS 200.

In this example, the ICV 214 is a spring-biased, three-port pressure regulating component, including a high pressure port 222 fluidically coupled to the fluid source 210, a low pressure port 220 fluidically coupled to the fluid return reservoir 212, and a service port 224 fluidically coupled to a directional control unit (DCU) 230. The ICV 214 is configured to transition between a first stage, where fluid flow between the low pressure port 220 and the service port 224 is permitted (see FIGS. 2A, 2D), and a second stage, where fluid flow between the high pressure port 222 and the service port 224 is permitted (see FIGS. 2B, 2C, and 2E). Thus, when the ICV 214 is in the first stage, the DCU 230 is placed in fluid communication with the fluid return reservoir 212, and when the ICV 214 is in the second stage, the DCU 230 is placed in fluid communication with the fluid source 210. The default stage of the ICV 214 is the first stage, which inhibits fluid flow into the DCU 230 for fire protection purposes. The ICV 214 further includes a pilot valve 221 that controls the transition from the first stage to the second stage, and vice versa.

The solenoid valve 218 is fluidically coupled to the ICV 214 and is configured to hydraulically control the ICV 214 to transition between different states/stages in response to a control signal—e.g., an activation/deactivation signal. Similar to the ICV 214, the solenoid valve 218 is a spring-biased, three-port device. Accordingly, the solenoid valve 218 includes a high pressure port 225 fluidically coupled to the fluid source 210, a low pressure port 226 fluidically coupled to the fluid return reservoir 212, and an actuator port 227. The actuator port 227 is fluidically coupled with the ICV 214.

The solenoid valve 218 transitions between ON and OFF conditions based on a received activation/deactivation control signal. In the OFF condition (see FIGS. 2A, 2D), fluid flow between the low pressure port 226 and the actuator port 227 is permitted, which provides return pressure to the pilot valve 221, leaving ICV 214 in the first stage position. In the ON condition (see FIGS. 2B, 2C, and 2E), fluid flow between the high pressure port 225 and the actuator port 227 is permitted, which places the pilot valve 221 of the ICV 214 in fluid communication with the fluid source 210. Unlike the relatively low pressure of fluid return reservoir 212, the relatively high pressure of fluid source 210 causes the ICV 214 to transition from the first to second stages. Like the ICV 214, the solenoid valve 218 defaults to the OFF condition to prevent unintentional fluid flow to the DCU 230.

The DCU 230 includes a directional control valve 232 ("DCV") and a solenoid valve 234 configured to concurrently control operation of the DCV 232. The DCV 232 and solenoid valve 234 are each fluidically coupled to the fluid source 210 through the ICU 208 and to fluid return reservoir 212 by various fluid lines. The DCV 232 further includes a pilot valve 233 that controls the transition from the first stage to the second stage, and vice versa.

In this example, the DCV 232 is a spring-biased, three-port pressure regulating component, including a high pressure port 237 fluidically coupled to the ICU 208, and a low pressure port 238 fluidically coupled to the fluid return reservoir 212. The DCV 232 is configured to transition between a first stage, where fluid flow between the low pressure port 238 and a service port 240 (in fluidic communication with the return fluid line 236) is permitted and fluid flow between the high pressure port 237 and a service port 241 is permitted (see FIGS. 2A, 2D), and a second stage, where fluid flow between the high pressure port 237 and the service port 240 and the service port 241 is permitted. Simultaneously, fluid flow from the low pressure port 238 to the service port 240 and the service port 241 is blocked (see FIGS. 2B, 2C, and 2E).

The solenoid valve 234 is fluidically coupled to the DCV 232 and is configured to hydraulically control the DCV 232 to transition between different states/stages in response to a control signal—e.g., an activation/deactivation signal. Similar to the DCV 232, the solenoid valve 234 is a spring-biased, three-port device. Accordingly, the solenoid valve 234 includes a high pressure port 242 fluidically coupled to the DCU 230, a low pressure port 243 fluidically coupled to the fluid return reservoir 212, and an actuator port 244. The actuator port 244 is fluidically coupled with the DCV 232.

The solenoid valve 234 transitions between ON and OFF conditions based on a received activation/deactivation control signal. In the OFF condition (see FIGS. 2A, 2D), fluid flow between the low pressure port 243 and the actuator port 244 is permitted, which maintains the DCV 232 in the first stage. In the ON condition (see FIGS. 2B, 2C, and 2E), fluid flow between the high pressure port 242 and the actuator port 244 is permitted, which places the pilot valve 233 of the DCV 232 in fluid communication with the fluid source 210 through the DCU 230. Unlike the relatively low pressure of fluid return reservoir 212, the relatively high pressure of fluid source 210 causes the DCV 232 to transition from the first to second stages. Like the DCV 232, the solenoid valve 234 defaults to the OFF condition to prevent unintentional fluid flow to downstream components of the TRAS 200.

As will be discussed in more detail below, in the first stage of the DCU 230, the actuators 202a-202d are provided with pressurized fluid to urge actuation in a first direction (e.g., retract). In the second stage of the DCU 230, the actuators 202a-202d are provided with pressurized fluid to urge actuation in a second direction opposite the first direction (e.g., extend). In the illustrated examples, the actuators 202a and 202b and the EHSV 203a are fluidically connected to the service ports 240 and 241 substantially in parallel, and are configured (e.g., affixed) to actuate a shared mechanical load (e.g., the example thrust-reversing element 24a). In the illustrated examples, the actuators 202c and 202d and the EHSV 203b are fluidically connected to the service ports 240 and 241 substantially in parallel, and are configured (e.g., affixed) to actuate another shared mechanical load (e.g., the example thrust-reversing element 24b).

The EHSVs 203a-203b of the example thrust-reverser actuation system 200 act both as directional control valves (DCV) and as flow limiting devices. In the illustrated examples, the EHSVs 203a-203b are spring-biased, four port pressure-regulating components. One side of the EHSVs 203a-203b includes a control port 250 in fluid communication with the fluid return reservoir 212, and a control port 248 in fluid communication with the service port 241.

The opposite sides of the EHSVs 203a-203b include a deploy port 252 and a stow port 254 fluidically coupled to the actuators 202a-202b. The EHSVs 203a-203b are configured to transition between a first stage and a second stage. The stage of the EHSVs 203a-203b dictates flow between the ports on its two opposite sides. In the first, default stage of the EHSVs 203a-203b (see FIGS. 2A, 2B, and 2E), the control port 248 is fluidically coupled to the stow port 254, and the control port 250 is fluidically coupled to the deploy port 252. In the second stage of the EHSVs 203a-203b (see FIG. 2C), the control port 248 is fluidically coupled to the deploy port 252, and the control port 250 is fluidically coupled to the stow port 254. In the third stage of the EHSVs 203a-203b, the control port 250, control port 248, the deploy port 252, and the stow port 254 are fluidically blocked.

The DCU 230 is located upstream of the EHSVs 203a-203b and the actuators 202a-202d, and includes various functional elements (described above) operable to selectively inhibit or permit fluid flow between the EHSVs 203a, 203b, the actuators 202a-202d, the fluid source 210, and the fluid return reservoir 212. The controller 206a is configured to control the operation of the EHSV 203a as a fluid control system, and the controller 206b is configured to control the operation of the EHSV 203b as another fluid control system.

The EHSV 203a is operable to selectively route fluid between the fluid source 210, the actuators 202a, and the fluid return reservoir 212 (e.g., through the service ports 240 and 241) in order to transition the actuators 202a and 202b (and the mechanically coupled thrust reverser door element) between stowed and deployed positions. In operation, the DCU 230 controls the direction of actuation of the actuators 202a and 202b, and a majority of the fluid used for actuation is provided directly from the DCU 230 to the actuators 202a and 202b. A position sensor 245a (e.g., a variable displacement transformer, VDT) is configured to sense the configuration (e.g., effector output position between extended and retracted) of the actuator 202a and provide a position feedback signal 239a representative of the configuration of the actuator 202a to the controller 206a. A position sensor 245b (e.g., a variable displacement transformer, VDT) is configured to sense the configuration of the actuator 202b and provide a position feedback signal 239b representative of the configuration of the actuator 202b to the controller 206a.

In operation, the controller 206a of the example thrust-reverser actuation system 200 receives the position feedback signal 239a and the position feedback signal 239b. The controller 206a compares the feedback signals 239a-239b to determine the output positions of the actuators 202a and 202b. In some embodiments, the controller 206a can be configured to determine the absolute positions of the actuator outputs of the actuators 202a and 202b. In some embodiments, the controller 206a can be configured to determine a relative difference between the positions of the actuator outputs of the actuators 202a and 202b. Based on the determined positional difference, the controller 206a provides a control signal through a control bus 242a to the EHSV 203a to control the EHSV 203a to controllably permit and block additional fluid flow from the service ports 240 and 241 through the EHSV 203a to the actuator 202a to urge substantial synchronization of the output of the actuator 202a with the output of the actuator 202b in a closed-loop control configuration.

The EHSV 203b is operable to selectively route fluid between the fluid source 210, the actuators 202c, and the fluid return reservoir 212 (e.g., through the service ports 240 and 241) in order to transition the actuators 202c and 202d (and the mechanically coupled thrust reverser door element) between stowed and deployed positions. In operation, the DCU 230 controls the direction of actuation of the actuators 202c and 202d, and a majority of the fluid used for actuation is provided directly from the DCU 230 to the actuators 202c and 202d. A position sensor 245c (e.g., a variable displacement transformer, VDT) is configured to sense the configuration (e.g., effector output position between extended and retracted) of the actuator 202c and provide a position feedback signal 239c representative of the configuration of the actuator 202c to the controller 206b. A position sensor 245d (e.g., a variable displacement transformer, VDT) is configured to sense the configuration of the actuator 202d and provide a position feedback signal 239d representative of the configuration of the actuator 202d to the controller 206b.

In operation, the controller 206b receives the position feedback signal 239c and the position feedback signal 239d. The controller 206b compares the feedback signals 239c-239d to determine the output positions of the actuators 202c and 202d. In some embodiments, the controller 206b can be configured to determine the absolute positions of the actuator outputs of the actuators 202c and 202d. In some embodiments, the controller 206b can be configured to determine a relative difference between the positions of the actuator outputs of the actuators 202c and 202d. Based on the determined positional difference, the controller 206b provides a control signal through a control bus 242b to the EHSV 203b to control the EHSV 203b to controllably permit and block additional fluid flow from the service ports 240 and 241 through the EHSV 203b to the actuator 202c to urge substantial synchronization of the output of the actuator 202c with the output of the actuator 202d in a closed-loop control configuration.

The actuators 202a-202d of the example thrust-reverser actuation system 200 are designed to move the respective elements (e.g., elements 24a and 24b shown in FIGS. 1A and 1B) of a thrust reverser (e.g., thrust reverser 22 of FIGS. 1A and 1B) between a stowed position and a deployed position. In this example, the actuators 202a-202d are substantially identical both structurally and functionally, and will therefore be described in unison. Each of the actuators 202a-202d includes a housing 266 having an interior cavity 268. The actuator housing 266 is mechanically coupled to the nacelle (e.g., nacelle 12) of the thrust reverser. The housing's interior cavity 268 receives an elongated actuator rod 270 (e.g., a mechanical output) including a piston member 272 at a proximal end and a coupler 274 at an opposite distal end. The coupler 274 attaches the actuator rod 270 to the element (e.g., door) of the thrust reverser, such that the element moves (e.g., pivots) in response to movement by the actuator rod 270. The piston member 272 of the actuator rod 270 seals against the wall of the housing's interior cavity 268, bifurcating the cavity into a deploy chamber 276 and a stow chamber 278. The actuator housing 266 further includes a deploy fluid port leading to the deploy chamber 276 and a stow port leading to the stow chamber 278. The deploy fluid port fluidically couples the deploy chamber 276 to the EHSV's deploy port 252 and to the service port 240, and the stow port fluidically couples the stow chamber 278 to the EHSV's stow port 254 and to the service port 241.

The actuator rod 270 is movable within the interior cavity 268 of the housing 266. For example, the actuator rod 270 is movable in response to unbalanced fluid pressure force between the deploy chamber 276 and the stow chamber 278 acting on the piston member 272. When the hydraulic pressure force in the deploy chamber 276 is greater than the hydraulic pressure force in the stow chamber 278, the actuator rod 270 moves "downward" to deploy the attached thrust reverser element. Conversely, when hydraulic pressure force in the stow chamber 278 is greater, the actuator rod 270 moves "upward" to stow the thrust reverser element. In this example, the actuators 202a-202d are "unbalanced," because the piston area exposed to fluid pressure in the deploy chamber 276 is greater than the piston area in the stow chamber 278 (due to the presence of the rod extending through the stow chamber). The greater piston area creates a greater hydraulic force output. As such, when the deploy chamber 276 and the stow chamber 278 are at equal pressure, the actuator rod 270 will be urged downward to deploy the thrust reverser element due to the greater force output of the deploy chamber 276. The position sensors 245a-245d are configured to sense the amounts of extension of the actuator rods 270.

Figure 2B:
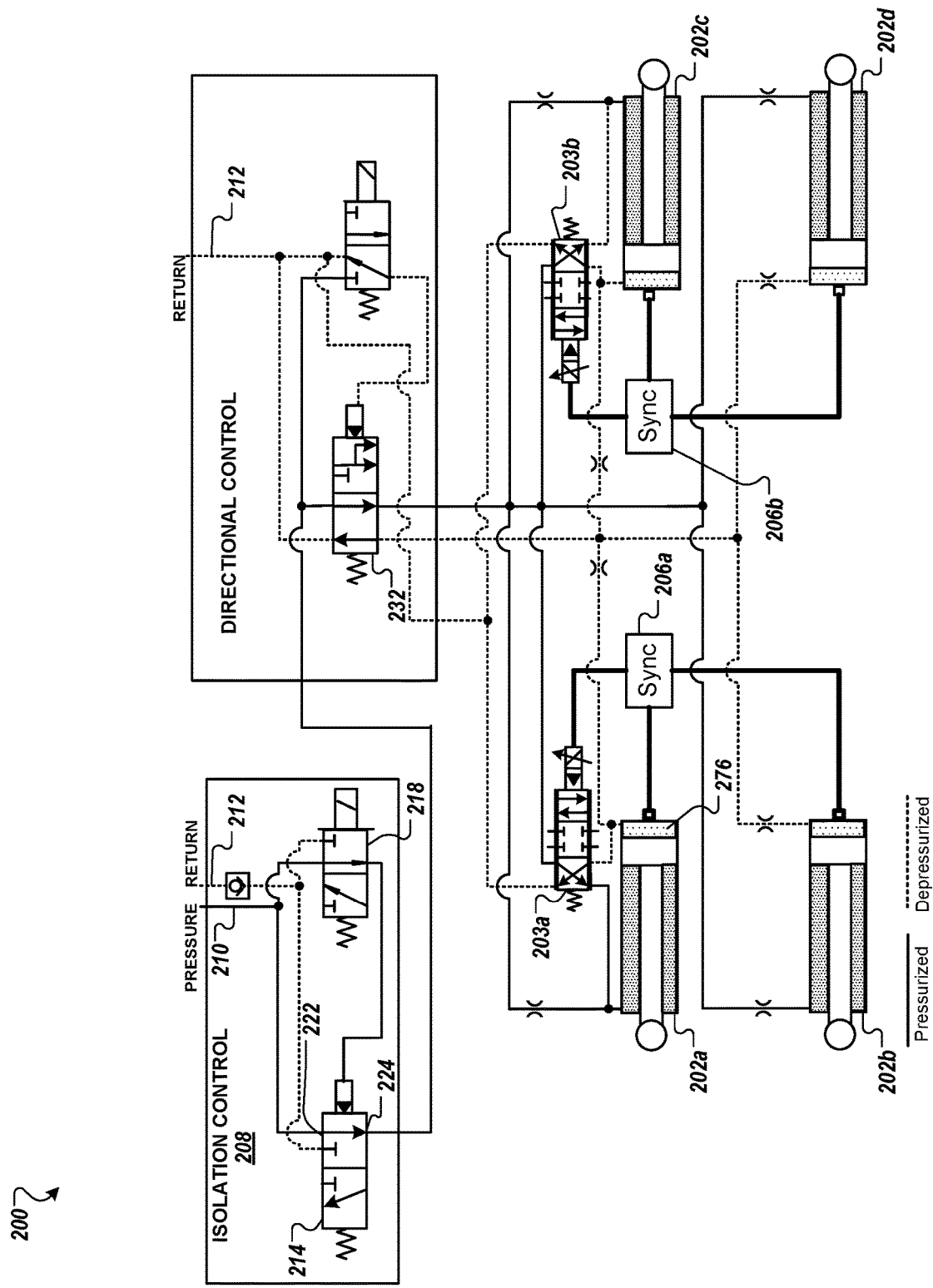
Figure 2C:
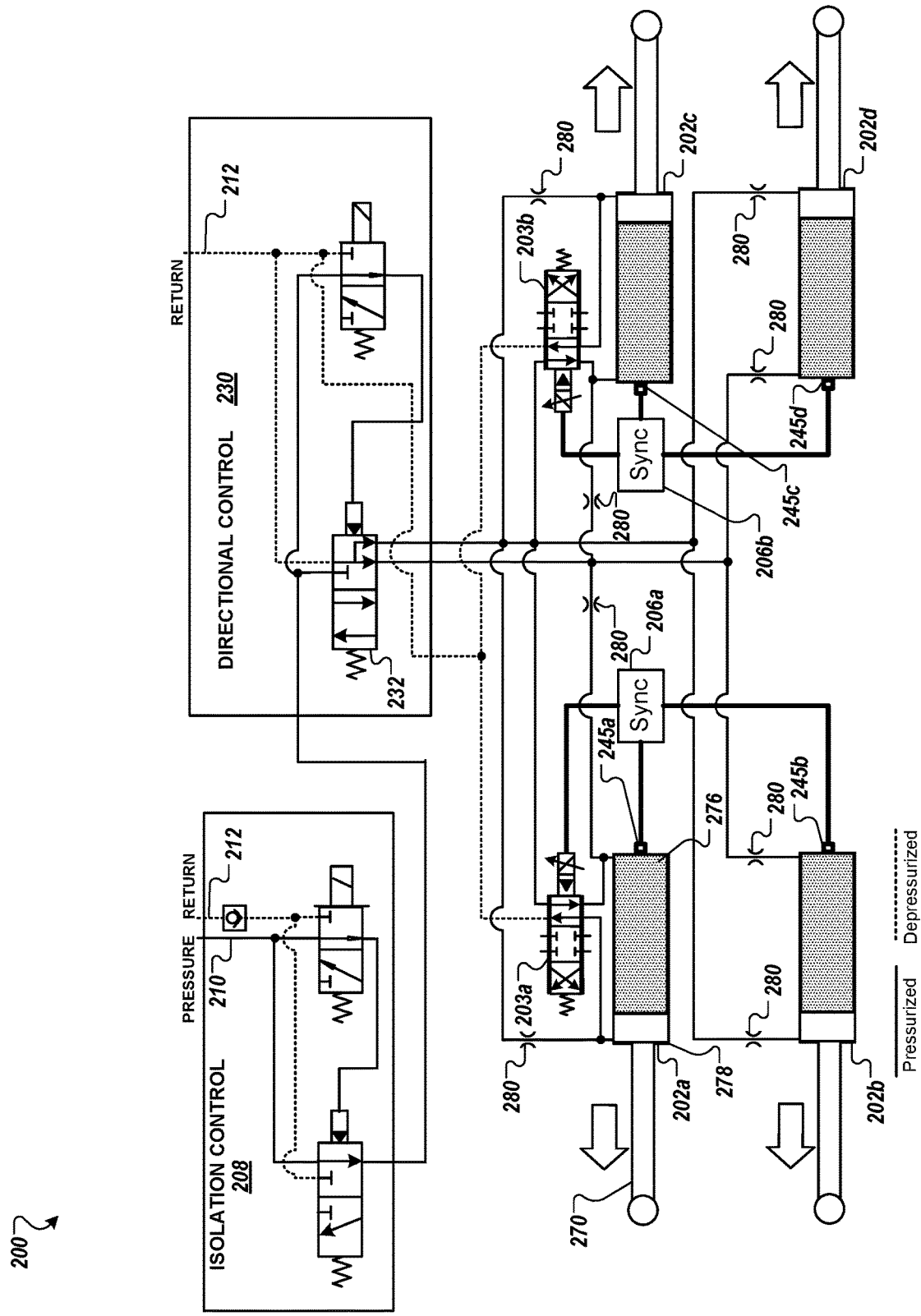
Figure 2D:
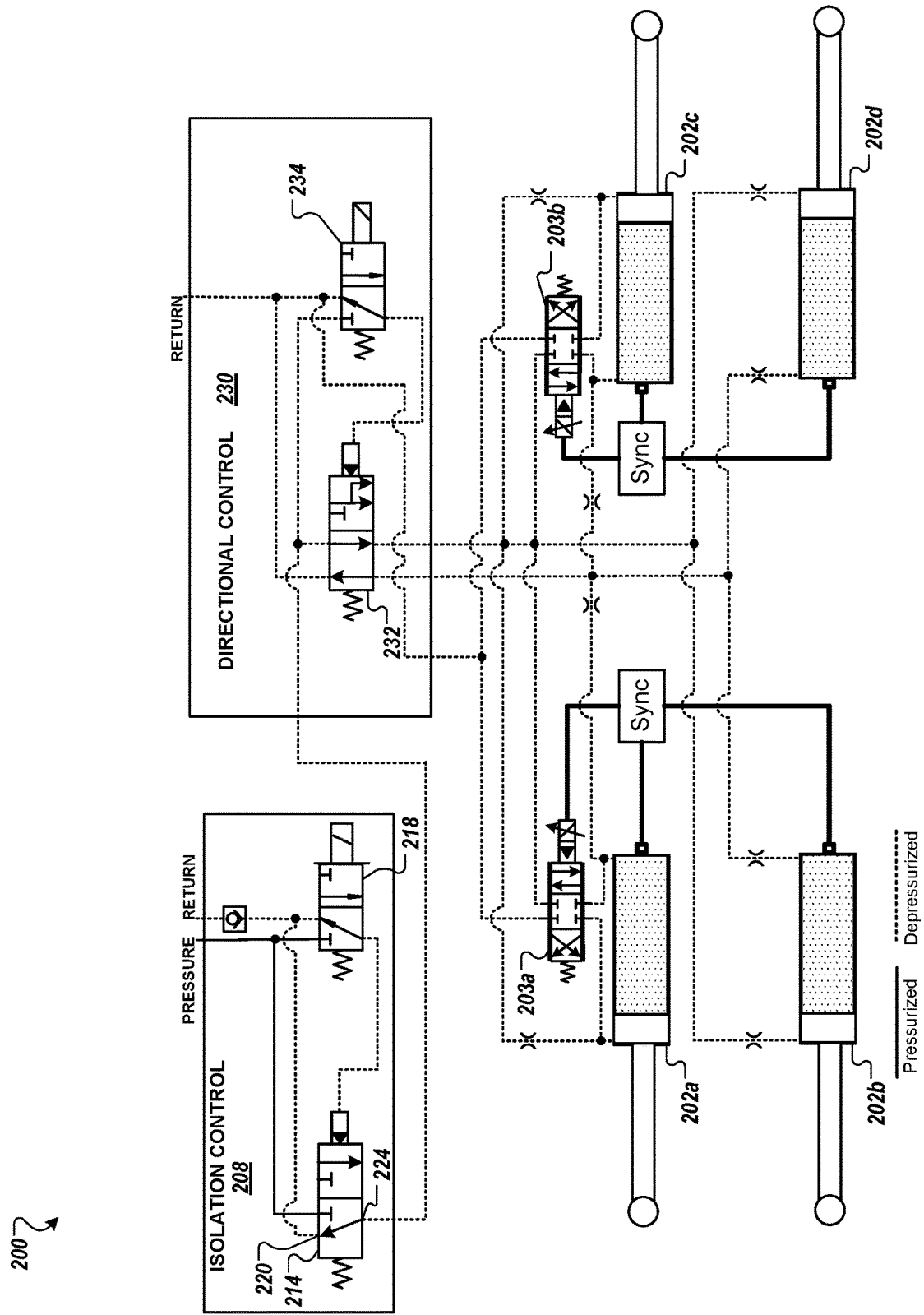

The EHSVs 203a and 203b are configured to supplement and/or inhibit the pressure/fluid draw by the actuators 202a and 202c on the fluid source 210 in order to keep actuation of the actuator 202a substantially in positional synchronicity with the actuator 202b, and keep actuation of the actuator 202c substantially in positional synchronicity with the actuator 202d during the deploy process (see FIG. 2C, 2D). In this example, the EHSV 203a is controlled by the controller 206a over a control bus 242a in a closed-loop control configuration, based on the position feedback signals received from the position sensors 245a-245b, and the EHSV 203b is controlled by the controller 206b over a control bus 242b in a closed-loop control configuration, based on the position feedback signals received from the position sensors 245c-245d. In some implementations, the controllers 206a and 206b can communicate or can be combined to substantially provide positional synchronicity for actuation of the actuators 202a-202b with the actuators 202c-202d.

In some embodiments, flow demand can be limited by the controllers 206a-206b and the EHSVs 203a-203b to allow the fluid source 210 and supporting system components (e.g., fluid lines, valves, etc.) to be appropriately provided in a configuration with practical weight, form factor/envelope, and cost. Regenerative and supplemental flow techniques can be incorporated into the TRAS to accommodate this limited flow demand without sacrificing deployment performance.

The above-described configurations of the EHSVs 203a-203b and the actuators 202a-202d enables synchronization of the actuators 202a-202d and/or recirculation of fluid during the deploy process for the example thrust-reverser actuation system 200. As previously discussed, the second stage of the EHSVs 203a-203d places the control port 248 in fluidic communication with the deploy port 252, and the control port 250 is placed in fluidic communication with the stow port 254. Thus, in this second stage, the deploy chamber 276 of the actuators 202a-202d is exposed to the relatively high pressure of the fluid source 210, and isolated from the relatively low pressure of the fluid return reservoir 212. The unbalanced configuration of the actuators 202a-202d causes the actuator rods 270 to deploy the thrust reverser elements in this state of the system.

As the elements begin to deploy, the force of surrounding airflow begins to pull the elements open, providing an "aiding load" that further urges the actuator rods 270 in the deploy direction. As the aiding load pulls the actuator rods 270, fluid is forced from the stow chamber 278 and simultaneously drawn into the deploy chamber 276, placing the former in high pressure and the latter in low pressure. In some implementations, the force of the "aiding load" on the actuator rods 270 can increase the fluid demand needed to backfill the deploy chamber 276. In some embodiments, fluid flow demand during the deploy process can be lessened by fluid recirculation from the stow chamber 278 to the deploy chamber 276.

In some embodiments, fluid flow demand during the deploy process can be further lessened by supplemental fluid flow provided by the portion of the low pressure line fluidically linked to the fluid return reservoir 212 through the service port 240. For example, a piloted check valve can be used in place of the check valve 216 to permit fluid flow in a single direction, from the low pressure fluid line in fluid communication with the service port 240 to the fluid return reservoir 212. However, when the solenoid valve 218 is in the second stage, fluid pressure from the fluid source 210 can be applied to the pilot port, forcing the piloted check valve open to allow fluid to flow from the fluid return reservoir 212 to the low pressure fluid line in fluid communication with the service port 240. This supplemental fluid flow can take place during the deploy process when fluid recirculation combined with the limited primary fluid flow from the fluid source 210 may be insufficient to meet the fluid draw of the deploy chamber 276 (e.g., the supplemental flow can make up for the imbalance between the stow chamber 278 and the deploy chamber 276). In such examples, the pressure of the deploy chamber 276 can fall below the pressure of the fluid return reservoir 212, which instigates the supplemental fluid flow.

FIG. 2A illustrates the TRAS 200 in an example stow condition, such as may be maintained during use while an aircraft is grounded or in flight. In the stow condition, the TRAS 200 is configured to inhibit fluid flow from the fluid source 210 to the EHSVs 203a-203b and the actuators 202a-202d. Accordingly, solenoid valve 218 is placed in the OFF condition, which causes ICV 214 to remain in the default first stage. As described above, the first stage of the ICV 214 fluidically couples its service port 224 to the low pressure port 220, placing the deploy port 252 in fluid communication with the low pressure of the fluid return reservoir 212. Thus, fluid is allowed to flow from the deploy chamber 276 to the fluid return reservoir 212 to potentially evacuate fluid from the system, while fluid flow from the fluid source to the actuators 202a-202d is prevented.

FIG. 2B illustrates the TRAS 200 in an example over-stow command condition. Here, the solenoid valve 218 is placed in the ON condition, which causes the ICV 214 to transition from its respective first-to-second stage. In the second stage of the ICV 214, the service port 224 is fluidically coupled to the high pressure port 222, placing the actuators 202a-202d and the EHSVs 203a-203b in fluid communication with the pressurized fluid source 210.

The controller 206a commands the EHSV 203a to its stow stage configuration, fluidically connecting the stow chamber 278 to the pressurized fluid source 210 and fluidically connecting the deploy chamber 276 to the fluid return reservoir 212. The controller 206b operates in a substantially similar manner as the controller 206a. In the illustrated example configuration, the actuators 202a-202d are urged into their stowed configuration. In some implementations, the TRAS 200 can be put into an over-stow configuration in order to aid in unlocking the actuators 202a-202d in preparation for a commanded deployment (e.g., to release an over-center locking mechanism to permit release, to relieve tension on a retaining pin to allow it to be retracted).

FIG. 2C illustrates the TRAS 200 in an example compressive load stage of a deploy command condition.

Here, the solenoid valve 218 remains in the ON condition, which causes the ICV 214 to remain in its second stage. In the second stage of the ICV 214, the service port 224 is fluidically coupled to the high pressure port 222, placing the EHSVs 203a-203b in fluid communication with the pressurized fluid source 210.

The DCV 232 is energized and ports hydraulic pressure to the deploy chamber 276 and the stow chamber 278 of the actuators. Since the actuators 202a-202d are "unbalanced" because the piston area exposed to fluid pressure in the deploy chamber 276 is greater than the piston area in the stow chamber 278 (due to the presence of the rod extending through the stow chamber), the greater piston area creates a greater hydraulic force output. As such, when the deploy chamber 276 and the stow chamber 278 are at equal pressure, the actuator rod 270 will be urged downward to deployment. The flow to the deploy chamber 276 and the outflow from the stow chamber 278 is limited by a collection of orifices 280 (e.g., flow regulators).

The position sensors 245a-245d provide electronic position feedback (e.g., linear or rotary variable displacement transformer signals). Based on the position feedback, the controllers 206a-206b can identify positional differentials between the actuators 202a-202d and control the EHSVs 203a-203b to port hydraulic fluid pressure to augment or retard the velocity of the actuators 202a and 202c in order to substantially follow the positions of the actuators 202b and 202d.

FIG. 2D illustrates the TRAS 200 in an example fully deployed condition, such as may be maintained during TRAS usage. In the fully deployed condition, the ICU 208 is (optionally) de-energized, causing the ICV 214 and the solenoid valve 218 to return in their default first stages. The first stage of the ICV 214 fluidically couples its service port 224 to the low pressure port 220, placing the deploy chamber 276 in fluid communication with the low pressure of the fluid return reservoir 212. Thus, fluid is allowed to flow from the deploy chamber 276 to the fluid return reservoir 212 to potentially evacuate fluid from the system, while fluid flow from the fluid source to the actuators 202a-202d and the EHSVs 203a-203b is prevented. In some implementations, external tension loads on the actuators 202a-202d can hold the TRAS 200 in the deploy position. The DCV 232 is energized, and the EHSVs 203a and 203b are energized to the deploy position.

Figure 2E:
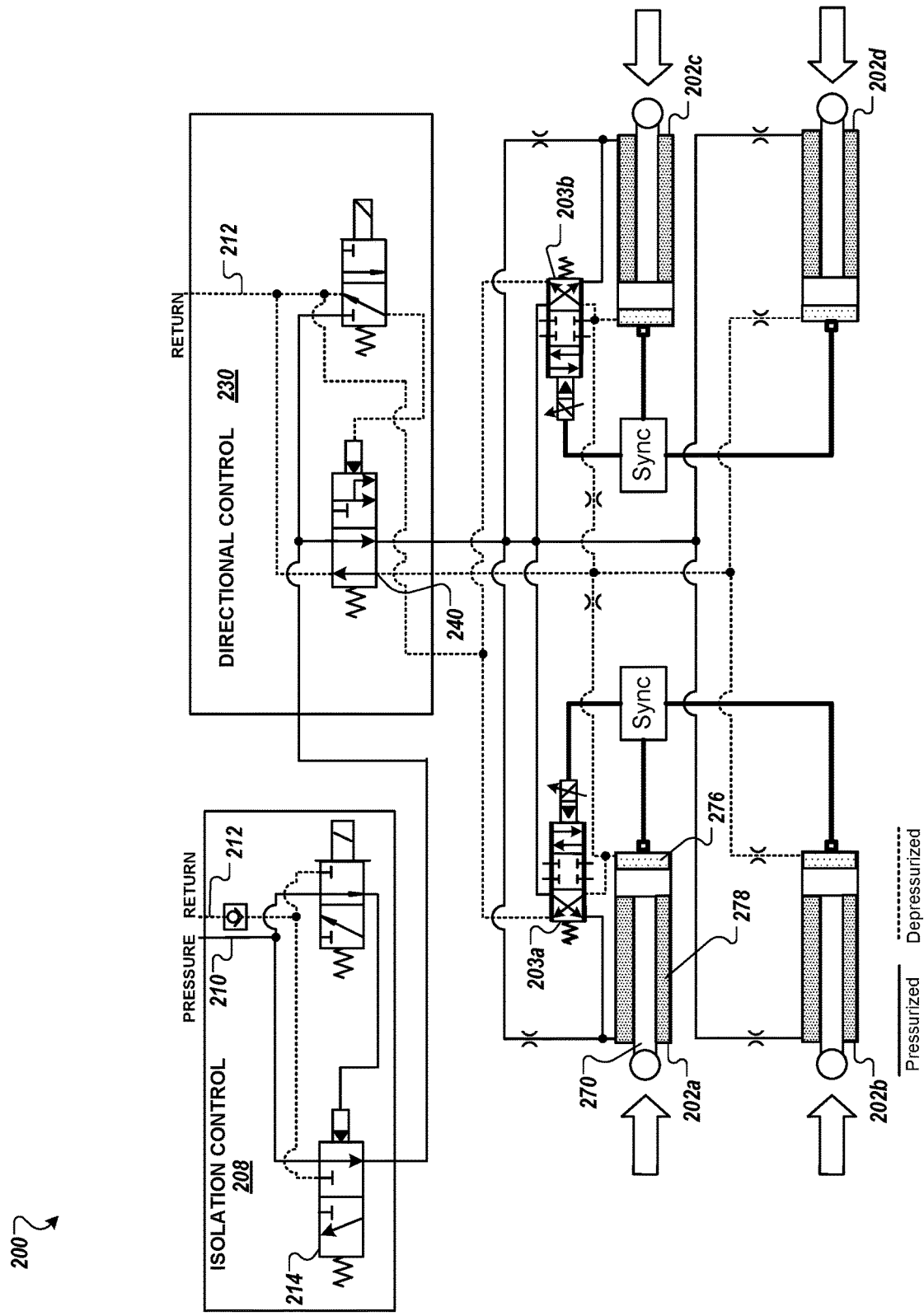

FIG. 2E illustrates the TRAS 200 in an example stow-command condition. The components of the ICU 208 and DCU 230 are operated identically to the over-stow-command condition. Pressurized fluid from the fluid source 210 is directed to the stow chamber 278 of the actuators 202a-202d to urge retraction of the actuator rods 270. Fluid in the deploy chamber 276 is urged into the service port 240 and toward the fluid return reservoir 212.

In the illustrated example configuration, at least two levels of safety against inadvertent stowing are provided. For example, the TRAS 200 is protected against failure of ICV 214 to open, and the TRAS 200 can be protected against the actuators 202a-202d being falsely commanded to stow.

The use of terminology such as "front," "rear," "top," "bottom," "raised," "lowered," "upwards," and "downwards" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

Figure 3:
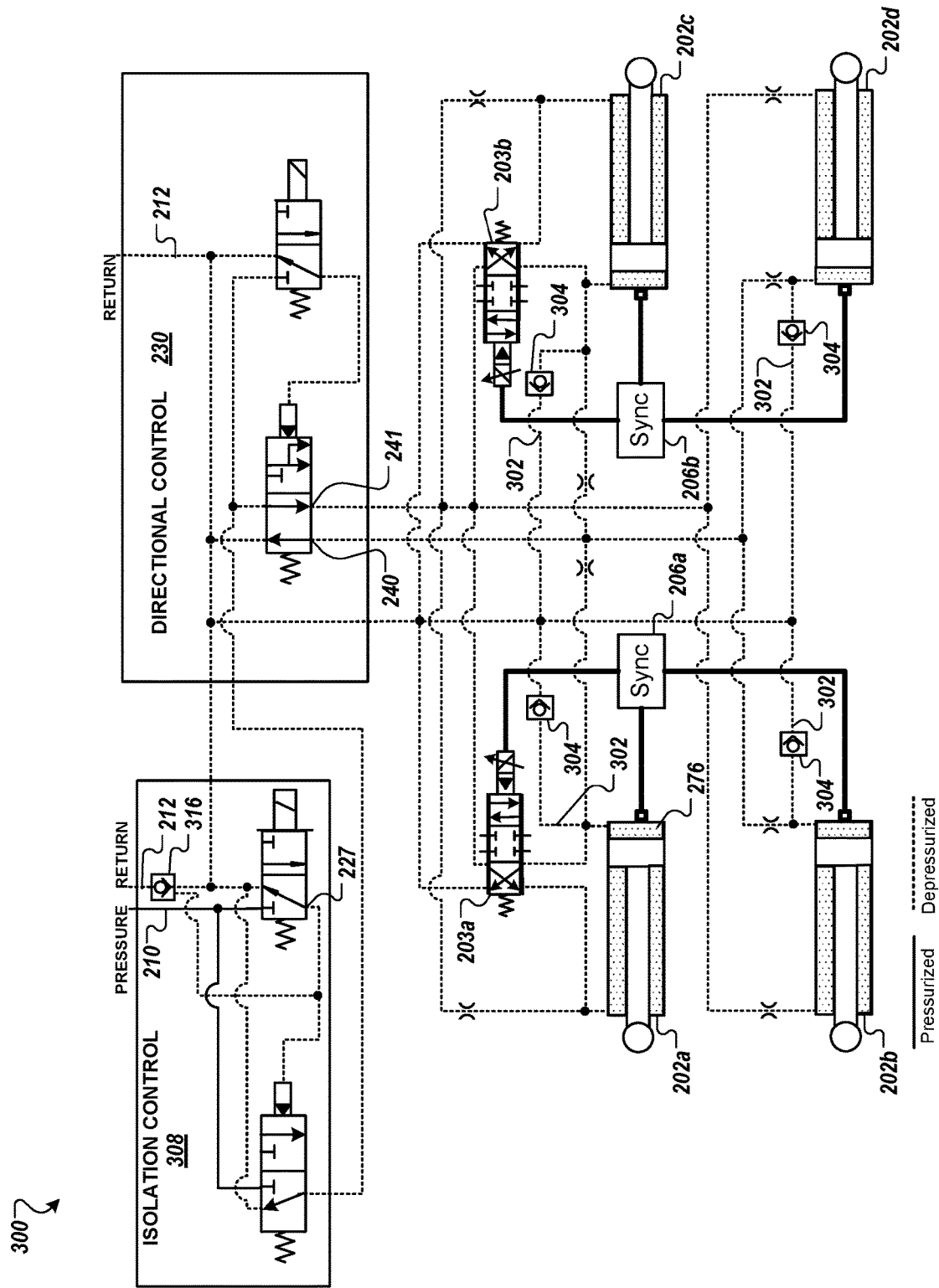
FIG. 3 is a schematic diagram of an example low-flow thrust-reverser actuation system.

FIG. 3 is a schematic diagram of an example low-flow TRAS 300. In some embodiments, the TRAS 300 can be the example TRAS 100 of FIG. 1A-1B. In some embodiments, the TRAS 300 can be a modification of the example TRAS 200 of FIGS. 2A-2E in which at least a portion of fluid flow can be taken from the fluid return reservoir 212 instead of from the fluid source 210 (e.g., hydraulic pump) during tension loads.

The TRAS 300 includes an ICU 308 that is substantially similar to the example ICU 208 of FIGS. 2A-2E, except the check valve 216 is replaced with a piloted check valve 316 configured to receive pilot pressure from the actuator port 227 and selectively allow fluid from the fluid return reservoir 212 to backflow.

In the illustrated embodiment, the EHSVs 203a-203b are configured to control the actuators 202a and 202c to follow the actuators 202b and 202c, in substantially the same way as in the example TRAS 200. A bypass fluid line 302 puts the deploy chamber 276 in fluid communication with the fluid return reservoir 212. A check valve 304 (e.g., an anti-cavitation check valve) acts as a fluidic diode, permitting fluid flow through the bypass fluid line 302 in a single direction, from the fluid return reservoir 212 to the deploy chamber 276, while blocking fluid flow in the opposite direction, from the deploy chamber 276 to the fluid return reservoir 212.

In the illustrated example, the actuators 202a-202d will function substantially the same as in the examples described in FIGS. 2A-2E. The difference in the example TRAS 300 is that during mid-deployment (e.g., at a point between the configurations described for FIGS. 2B and 2C), the thrust-reversing elements that are being actuated by the actuators 202a-202d (e.g., the thrust-reversing elements 24a and 24b) can catch wind resistance as they open. This wind resistance can create a large tension load that can urge the actuators 202a-202d to deploy, drawing the deploy chamber 276 open faster than the fluid source 210 can supply fluid to backfill the demand. In such examples, the fluid pressure at the deploy chamber 276 side of the bypass fluid line 302 will be at a lower pressure than the fluid return reservoir 212, causing the check valve 304 to open and permit fluid from the fluid return reservoir 212 to be drawn into the deploy chamber 276. The EHSVs 203a and 203b can be controlled to substantially synchronize the motions of the actuators 202a and 202c with the motions of their respectively paired actuators 202b and 202d. The piloted check valve 316 receives pilot pressure from the actuator port 227, which opens the piloted check valve 316 to permit additional fluid from the fluid return reservoir 212 to the actuators 202a-202d to make up for any volumetric fluid deficits that might occur due to the structure of the actuators 202a-202d as they operate.

In some embodiments, additional flow control components (e.g., controllable valves, flow restrictors) can be added along the bypass fluid line 302 to control the rate at which fluid can be drawn from the fluid return reservoir 212 (e.g., to control deployment speed, to provide additional safety against inadvertent deployment due to aiding forces).

FIGS. 4A-4E are progressive diagrams illustrating operation of another example TRAS 400 during deployment and stowing of the thrust reverser elements. In some embodiments, the TRAS 400 can be the example TRAS 100 of FIGS. 1A-1B.

FIGS. 4A-4E are progressive diagrams illustrating operation of an example thrust-reverser actuation system (TRAS) 400 during deployment and stowing of the thrust reverser elements. In some embodiments, the TRAS 400 can be the example TRAS 100 of FIGS. 1A-1B. The TRAS 400 may be used in conjunction with the example engine assembly 10 shown and described above with respect to FIGS. 1A and 1B. Thus, similar to the TRAS 100, the TRAS 400 includes first, second, third, and fourth actuators 402a-402d, first and second electrohydraulic servo valves (EHSVs) 403a, 403b, and first and second controllers 406a, 406b (the hydraulic locks are not shown in this example).

The TRAS 400 further includes an isolation control unit 408 ("ICU"), a fluid source 410, and a fluid return reservoir 412. The fluid source 410 may include one or more suitable pressure regulating apparatuses (e.g. a pump) for controlling (e.g., increasing) the pressure of a working fluid (e.g., a hydraulic fluid). The fluid return reservoir 412 may include one or more vessels for receiving working fluid passed through various components of the actuating system, containing the working fluid, and supplying the working fluid to the fluid source 410. The ICU 408 is configured to selectively permit and block the flow of fluid from the fluid source 410 to the rest of the TRAS 400.

In this example, the ICU 408 includes an isolation control valve 414 ("ICV"), a check valve 416 arranged along a return fluid line 436, and a solenoid valve 418 configured to concurrently control operation of the isolation control valve 414. The ICV 414 and the solenoid valve 418 are each fluidically coupled to the fluid source 410 and fluid return reservoir 412 by various fluid lines. The check valve 416 is fluidically coupled to the fluid return reservoir 412. As shown, with respect to the fluid return reservoir 412, the check valve 416 is located upstream of substantially all other functional components of the TRAS 400.

In this example, the ICV 414 is a spring-biased, three-port pressure regulating component, including a high pressure port 422 fluidically coupled to the fluid source 410, a low pressure port 420 fluidically coupled to the fluid return reservoir 412, and a service port 424 fluidically coupled to a directional control unit (DCU) 430. The ICV 414 is configured to transition between a first stage, where fluid flow between the low pressure port 420 and the service port 424 is permitted (see FIGS. 4A, 4D), and a second stage, where fluid flow between the high pressure port 422 and the service port 424 is permitted (see FIGS. 4B, 4C, and 4E). Thus, when the ICV 414 is in the first stage, the DCU 430 is placed in fluid communication with the fluid return reservoir 412, and when the ICV 414 is in the second stage, the DCU 430 is placed in fluid communication with the fluid source 410. The default stage of the ICV 414 is the first stage, which inhibits fluid flow into the DCU 430 for fire protection purposes. The ICV 414 further includes a pilot valve 421 that controls the transition from the first stage to the second stage, and vice versa.

The solenoid valve 418 is fluidically coupled to the ICV 414 and is configured to hydraulically control the ICV 414 to transition between different states/stages in response to a control signal—e.g., an activation/deactivation signal. Similar to the ICV 414, the solenoid valve 418 is a spring-biased, three-port device. Accordingly, the solenoid valve 418 includes a high pressure port 425 fluidically coupled to the fluid source 410, a low pressure port 426 fluidically coupled to the fluid return reservoir 412, and an actuator port 427. The actuator port 427 is fluidically coupled with the ICV 414.

The solenoid valve 418 transitions between ON and OFF conditions based on a received activation/deactivation control signal. In the OFF condition (see FIGS. 4A, 4D), fluid flow between the low pressure port 426 and the actuator port 427 is permitted, which provides return pressure to the pilot valve 421, leaving ICV 414 in the first stage position. In the ON condition (see FIGS. 4B, 4C, and 4E), fluid flow between the high pressure port 425 and the actuator port 427 is permitted, which places the pilot valve 421 of the ICV 414 in fluid communication with the fluid source 410. Unlike the relatively low pressure of fluid return reservoir 412, the relatively high pressure of fluid source 410 causes the ICV 414 to transition from the first to second stages. Like the ICV 414, the solenoid valve 418 defaults to the OFF condition to prevent unintentional fluid flow to the DCU 430.

The DCU 430 includes a directional control valve 432 ("DCV") and a solenoid valve 434 configured to concurrently control operation of the DCV 432. The DCV 432 and solenoid valve 434 are each fluidically coupled to the fluid source 410 through the ICU 408 and to fluid return reservoir 412 by various fluid lines. The DCV 432 further includes a pilot valve 433 that controls the transition from the first stage to the second stage, and vice versa.

In this example, the DCV 432 is a spring-biased, three-port pressure regulating component, including a high pressure port 437 fluidically coupled to the ICU 408, and a low pressure port 438 fluidically coupled to the fluid return reservoir 412. The DCV 432 is configured to transition between a first stage, where fluid flow between the low pressure port 438 and a service port 440 (in fluidic communication with the return fluid line 436) is permitted and fluid flow between the high pressure port 437 and a service port 441 is permitted (see FIGS. 4A, 4D), and a second stage, where fluid flow between the high pressure port 437 and the service port 440 and the service port 441 is permitted. Simultaneously, fluid flow from the low pressure port 438 to the service port 440 and the service port 441 is blocked (see FIGS. 4B, 4C, and 4E).

The solenoid valve 434 is fluidically coupled to the DCV 432 and is configured to hydraulically control the DCV 432 to transition between different states/stages in response to a control signal—e.g., an activation/deactivation signal. Similar to the DCV 432, the solenoid valve 434 is a spring-biased, three-port device. Accordingly, the solenoid valve 434 includes a high pressure port 442 fluidically coupled to the DCU 430, a low pressure port 443 fluidically coupled to the fluid return reservoir 412, and an actuator port 444. The actuator port 444 is fluidically coupled with the DCV 432.

The solenoid valve 434 transitions between ON and OFF conditions based on a received activation/deactivation control signal. In the OFF condition (see FIGS. 4A, 4D), fluid flow between the low pressure port 443 and the actuator port 444 is permitted, which the DCV 432 in the first stage. In the ON condition (see FIGS. 4B, 4C, and 4E), fluid flow between the high pressure port 442 and the actuator port 444 is permitted, which places the pilot valve 433 of the DCV 432 in fluid communication with the fluid source 410 through the DCU 430. Unlike the relatively low pressure of the fluid return reservoir 412, the relatively high pressure of fluid source 410 causes the DCV 432 to transition from the first to second stages. Like the DCV 432, the solenoid valve 434 defaults to the OFF condition to prevent unintentional fluid flow to downstream components of the TRAS 400.

As will be discussed in more detail below, in the first stage of the DCU 430, the actuators 402a-402d are provided with pressurized fluid to urge actuation in a first direction (e.g., retract). In the second stage of the DCU 430, the actuators 402a-402d are provided with pressurized fluid to urge actuation in a second direction opposite the first direction (e.g., extend). In the illustrated examples, the actuators 402a and 402b and the EHSV 403a are fluidically connected to the service ports 440 and 441 substantially in parallel, and are configured (e.g., affixed) to actuate a shared mechanical load (e.g., the example thrust-reversing element 24a). In the illustrated examples, the actuators 402c and 402d and the EHSV 403b are fluidically connected to the service ports 440 and 441 substantially in parallel, and are configured (e.g., affixed) to actuate another shared mechanical load (e.g., the example thrust-reversing element 24b).

The EHSVs 403a-403b act both as directional control valves (DCV) and as flow limiting devices. In the illustrated examples, the EHSVs 403a-403b are spring-biased, four port pressure-regulating components. One side of the EHSVs 403a-403b includes a control port 450 in fluid communication with the fluid return reservoir 412, and a control port 448 in fluid communication with the service port 441.

The opposite sides of the EHSVs 403a-403b include a deploy port 452 and a stow port 454 fluidically coupled to the actuators 402a-402b. The EHSVs 403a-403b are configured to transition between a first stage, a second stage, and a third stage. The stage of the EHSVs 403a-403b dictates flow between the ports on its two opposite sides. In the first, default stage of the EHSVs 403a-403b (see FIGS. 4A, 4B, and 4E), the control port 448 is fluidically coupled to the stow port 454, and the control port 450 is fluidically coupled to the deploy port 452. In the second stage of the EHSVs 403a-403b (see FIG. 4C), the control port 448 is fluidically coupled to the deploy port 452, and the control port 450 is fluidically coupled to the stow port 454. In the third stage of the EHSVs 403a-403b, the control port 450, control port 448, the deploy port 452, and the stow port 454 are fluidically blocked.

The DCU 430 is located upstream of the EHSVs 403a-403b and the actuators 402a-402d, and includes various functional elements (described above) operable to selectively inhibit or permit fluid flow between the EHSVs 403a, 403b, the actuators 402a-402d, the fluid source 410, and the fluid return reservoir 412. The controller 406a is configured to control the operation of the EHSV 403a as a fluid control system, and the controller 406b is configured to control the operation of the EHSV 403b as another fluid control system.

The EHSV 403a is operable to selectively route fluid between the fluid source 410, the actuators 402a, and the fluid return reservoir 412 (e.g., through the service ports 440 and 441) in order to transition the actuators 402a and 402b (and the mechanically coupled thrust reverser door element) between stowed and deployed positions. In operation, the DCU 430 controls the direction of actuation of the actuators 402a and 402b, and a majority of the fluid used for actuation is provided directly from the DCU 430 to the actuators 402a and 402b. A position sensor 445a (e.g., a variable displacement transformer, VDT) is configured to sense the configuration (e.g., effector output position between extended and retracted) of the actuator 402a and provide a position feedback signal 439a representative of the configuration of the actuator 402a to the controller 406a. A position sensor 445b (e.g., a variable displacement transformer, VDT) is configured to sense the configuration of the actuator 402b and provide a position feedback signal 439b representative of the configuration of the actuator 402b to the controller 406a.

A controller 490 and an EHSV 492 are configured to provide synchronization of the actuators 402a and 402b with the actuators 402c and 402d. The EHSV 492 is fluidically connected to the service ports 440 and 441 substantially in parallel with the actuators 402a-402d and the EHSV's 403a-403b. The controller 490 is configured to receive positional feedback signals from at least the sensor 445b (and/or the sensor 445a) as well as from the sensor 445d (and/or the sensor 445c). Since the positional outputs of the actuators 402a and 402b are substantially synchronized (e.g., by the controller 406a), the position signal provided by the sensor 445b is representative of the position of both of the actuators 402a-402b as well as the element they are configured to actuate (e.g., the element 24a). In a similar manner, since the positional outputs of the actuators 402c and 402d are substantially synchronized (e.g., by the controller 406b), the position signal provided by the sensor 445d is representative of the position of both of the actuators 402c-402d as well as the element they are configured to actuate (e.g., the element 24b).

The EHSV 492 acts both as a directional control valve (DCV) and as a flow limiting device. In the illustrated examples, the EHSV 492 is a spring-biased, four port pressure-regulating component. One side of the EHSV 492 includes a control port 497 in fluid communication with the fluid return reservoir 412, and a control port 498 in fluid communication with the service port 441.

The opposite side of the EHSV 492 includes a deploy port 495 and a stow port 496 fluidically coupled to the actuator 402b. The EHSV 492 is configured to transition between a first stage, a second stage, and a third stage. The stage of the EHSV 492 dictates flow between the ports on its two opposite sides. In the first, default stage of the EHSV 492, the control port 497 is fluidically coupled to the deploy port 495, and the control port 498 is fluidically coupled to the stow port 496. In the second stage, the control port 497 is fluidically coupled to the stow port 496, and the control port 498 is fluidically coupled to the deploy port 495. In the third stage of the EHSV 492, the control port 497, control port 498, the deploy port 495, and the stow port 496 are fluidically blocked.

The controller 490 is configured to compare the feedback signals from the sensors 445b and 445d and determine any positional difference exists between the outputs of the actuators 402a-402b and the actuators 402c-402d. As will be discussed in more detail below, the controller 490 can control the EHSV 492 based on the received positional feedback and the determined positional difference (if any is identified).

In operation, the controller 406a receives the position feedback signal 439a and the position feedback signal 439b. The controller 406a compares the feedback signals 439a-439b to determine the output positions of the actuators 402a and 402b. In some embodiments, the controller 406a can be configured to determine the absolute positions of the actuator outputs of the actuators 402a and 402b. In some embodiments, the controller 406a can be configured to determine a relative difference between the positions of the actuator outputs of the actuators 402a and 402b. Based on the determined positional difference, the controller 406a provides a control signal through a control bus 442a to the EHSV 403a to control the EHSV 403a to controllably permit and block additional fluid flow from the service ports 440 and 441 through the EHSV 403a to the actuator 402a to urge substantial synchronization of the output of the actuator 402a with the output of the actuator 402b in a closed-loop control configuration.

The EHSV 403b is operable to selectively route fluid between the fluid source 410, the actuators 402c, and the fluid return reservoir 412 (e.g., through the service ports 440 and 441) in order to transition the actuators 402c and 402d (and the mechanically coupled thrust reverser door element) between stowed and deployed positions. In operation, the DCU 430 controls the direction of actuation of the actuators 402c and 402d, and a majority of the fluid used for actuation is provided directly from the DCU 430 to the actuators 402c and 402d. A position sensor 445c (e.g., a variable displacement transformer, VDT) is configured to sense the configuration (e.g., effector output position between extended and retracted) of the actuator 402c and provide a position feedback signal 439c representative of the configuration of the actuator 402c to the controller 406b. A position sensor 445d (e.g., a variable displacement transformer, VDT) is configured to sense the configuration of the actuator 402d and provide a position feedback signal 439d representative of the configuration of the actuator 402d to the controller 406b.

In operation, the controller 406b receives the position feedback signal 439c and the position feedback signal 439d. The controller 406b compares the feedback signals 439c-439d to determine the output positions of the actuators 402c and 402d. In some embodiments, the controller 406b can be configured to determine the absolute positions of the actuator outputs of the actuators 402c and 402d. In some embodiments, the controller 406b can be configured to determine a relative difference between the positions of the actuator outputs of the actuators 402c and 402d. Based on the determined positional difference, the controller 406b provides a control signal through a control bus 442b to the EHSV 403b to control the EHSV 403b to controllably permit and block additional fluid flow from the service ports 440 and 441 through the EHSV 403b to the actuator 402c to urge substantial synchronization of the output of the actuator 402c with the output of the actuator 402d in a closed-loop control configuration.

The actuators 402a-402d are designed to move the respective elements (e.g., elements 24a and 24b shown in FIGS. 1A and 1B) of a thrust reverser (e.g., thrust reverser 22 of FIGS. 1A and 1B) between a stowed position and a deployed position. In this example, the actuators 402a-402d are substantially identical both structurally and functionally, and will therefore be described in unison. Each of the actuators 402a-402d includes a housing 466 having an interior cavity 468. The actuator housing 466 is mechanically coupled to the nacelle (e.g., nacelle 12) of the thrust reverser. The housing's interior cavity 468 receives an elongated actuator rod 470 (e.g., a mechanical output) including a piston member 472 at a proximal end and a coupler 474 at an opposite distal end. The coupler 474 attaches the actuator rod 470 to the element (e.g., door) of the thrust reverser, such that the element moves (e.g., pivots) in response to movement by the actuator rod 470. The piston member 472 of the actuator rod 470 seals against the wall of the housing's interior cavity 468, bifurcating the cavity into a deploy chamber 476 and a stow chamber 478. The actuator housing 466 further includes a deploy fluid port leading to the deploy chamber 476 and a stow port leading to the stow chamber 478. The deploy fluid port fluidically couples the deploy chamber 476 to the EHSV's deploy port 452 and to the service port 440, and the stow port fluidically couples the stow chamber 478 to the EHSV's stow port 454 and to the service port 441.

The actuator rod 470 is movable within the interior cavity 468 of the housing 466. For example, the actuator rod 470 is movable in response to unbalanced fluid pressure force between the deploy chamber 476 and the stow chamber 478 acting on the piston member 472. When the hydraulic pressure force in the deploy chamber 476 is greater than the hydraulic pressure force in the stow chamber 478, the actuator rod 470 moves "downward" to deploy the attached thrust reverser element. Conversely, when hydraulic pressure force in the stow chamber 478 is greater, the actuator rod 470 moves "upward" to stow the thrust reverser element. In this example, the actuators 402a-402d are "unbalanced," because the piston area exposed to fluid pressure in the deploy chamber 476 is greater than the piston area in the stow chamber 478 (due to the presence of the rod extending through the stow chamber). The greater piston area creates a greater hydraulic force output. As such, when the deploy chamber 476 and the stow chamber 478 are at equal pressure, the actuator rod 470 will be urged downward to deploy the thrust reverser element due to the greater force output of the deploy chamber 476. The position sensors 445a-445d are configured to sense the amounts of extension of the actuator rods 470.

Figure 4A:
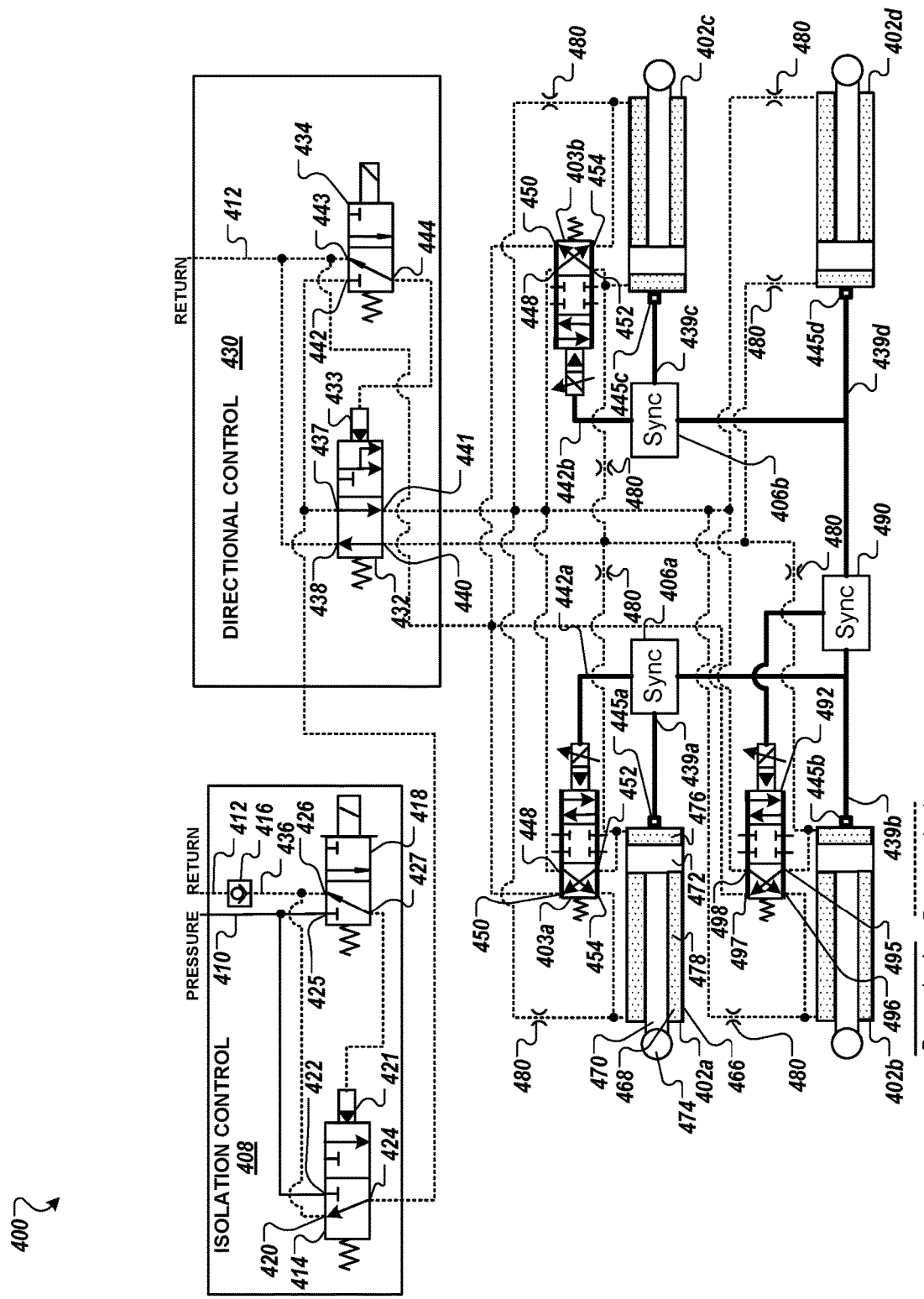
FIGS. 4A-4E are progressive diagrams illustrating operation of a first example thrust-reverser actuation system during deployment and stowing of the thrust reverser elements.
Figure 4B:
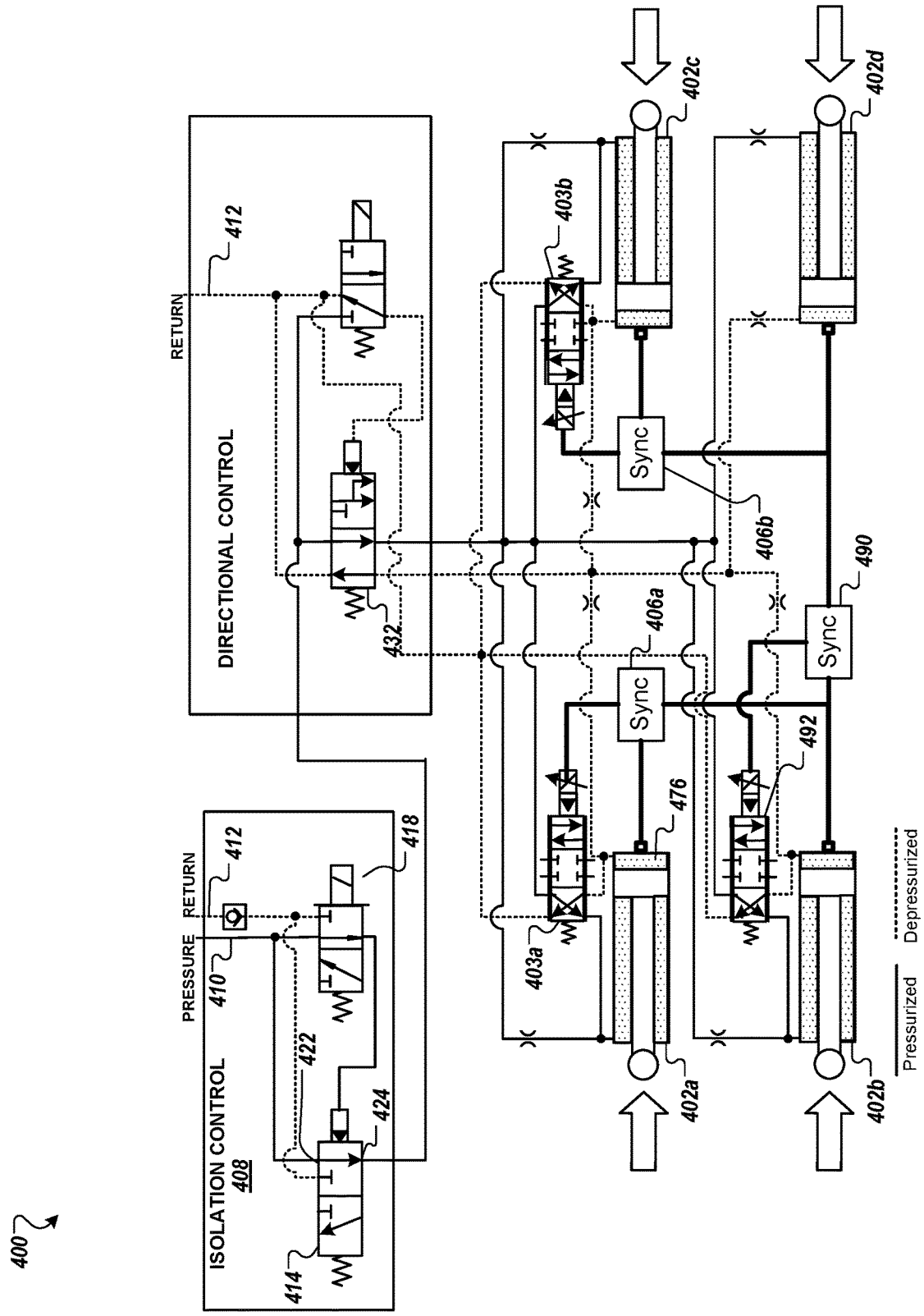
Figure 4C:
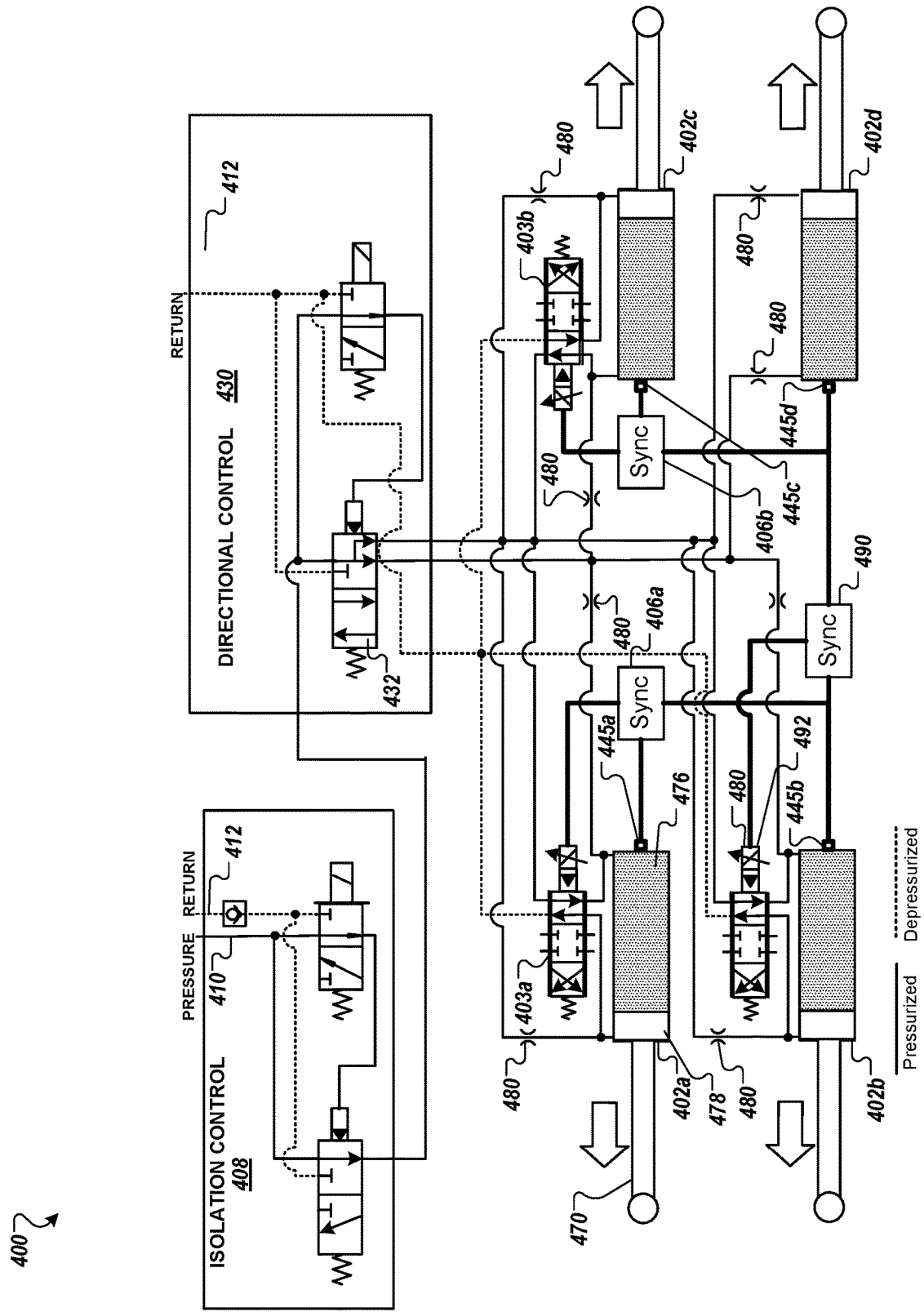
Figure 4D:
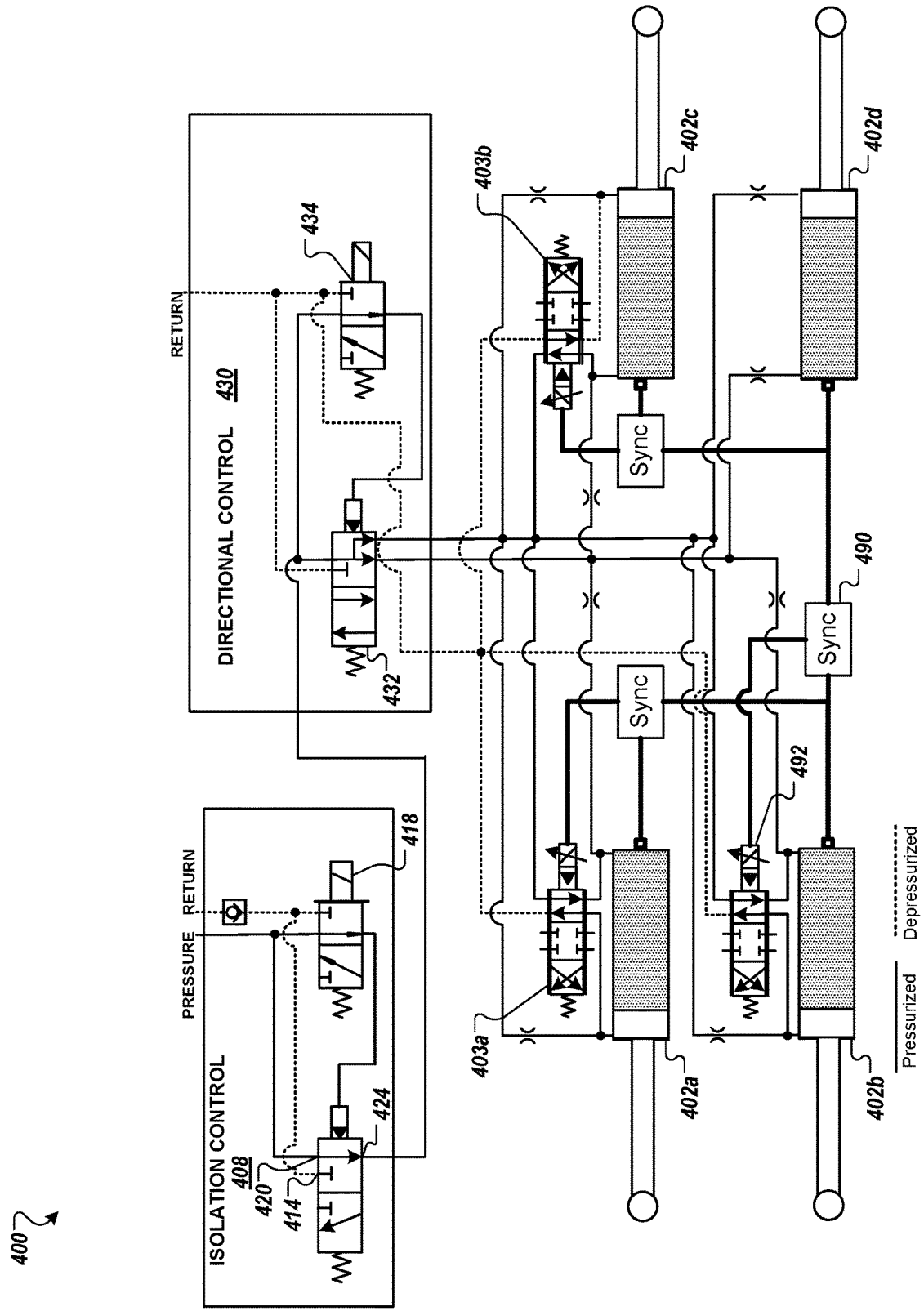

The EHSVs 403a and 403b are configured to supplement and/or inhibit the pressure/fluid draw by the actuators 402a and 402c on the fluid source 410 in order to keep actuation of the actuator 402a substantially in positional synchronicity with the actuator 402b, and keep actuation of the actuator 402c substantially in positional synchronicity with the actuator 402d during the deploy process (see FIG. 4C, 4D). In this example, the EHSV 403a is controlled by the controller 406a over a control bus 442a in a closed-loop control configuration, based on the position feedback signals received from the position sensors 445a-445b, and the EHSV 403b is controlled by the controller 406b over a control bus 442b in a closed-loop control configuration, based on the position feedback signals received from the position sensors 445c-445d. In some implementations, the controllers 406a and 406b can communicate or can be combined to substantially provide positional synchronicity for actuation of the actuators 402a-402b with the actuators 402c-402d.

In operation, the controller 490 receives position feedback signals from at least the position sensors 445b and 445d. The controller 490 compares the feedback signals to determine the output positions of at least the actuators 402b and 402d. In some embodiments, the controller 490 can be configured to determine the absolute positions of the actuator outputs of at least the actuators 402b and 402d. In some embodiments, the controller 490 can be configured to determine a relative difference between the positions of the actuator outputs of at least the actuators 402b and 402d. Based on the determined positional difference, the controller 490 provides a control signal to the EHSV 492 to control the EHSV 492 to controllably permit and block additional fluid flow from the control ports 497 and 498 through the EHSV 492 to the actuator 402b to urge substantial synchronization of the output of the actuator 402b with the output of the actuator 402d in a closed-loop control configuration.

In some embodiments, flow demand can be limited by the controllers 406a-406b, the controller 490, the EHSVs 403a-403b, and the EHSV 492 to allow the fluid source 410 and supporting system components (e.g., fluid lines, valves, etc.) to be appropriately provided in a configuration with practical weight, form factor/envelope, and cost. Regenerative and supplemental flow techniques can be incorporated into the TRAS to accommodate this limited flow demand without sacrificing deployment performance.

The above-described configurations of the EHSVs 403a-403b, the EHSV 492, and the actuators 402a-402d enable synchronization of the actuators 402a-402d and/or recirculation of fluid during the deploy process. As previously discussed, the second stage of the EHSVs 403a-403d places the control port 448 in fluidic communication with the deploy port 452, and the control port 450 is placed in fluidic communication with the stow port 454. Thus, in this second stage, the deploy chamber 476 of the actuators 402a-402d is exposed to the relatively high pressure of the fluid source 410, and isolated from the relatively low pressure of the fluid return reservoir 412. The unbalanced configuration of the actuators 402a-402d causes the actuator rods 470 to deploy the thrust reverser elements in this state of the system.

As the elements begin to deploy, the force of surrounding airflow begins to pull the elements open, providing an "aiding load" that further urges the actuator rods 470 in the deploy direction. As the aiding load pulls the actuator rods 470, fluid is forced from the stow chamber 478 and is simultaneously drawn into the deploy chamber 476, placing the former in high pressure and the latter in low pressure. In some implementations, the force of the "aiding load" on the actuator rods 470 can increase the fluid demand needed to backfill the deploy chamber 476. In some embodiments, fluid flow demand during the deploy process can be lessened by fluid recirculation from the stow chamber 478 to the deploy chamber 476.

In some embodiments, fluid flow demand during the deploy process can be further lessened by supplemental fluid flow provided by the portion of the low pressure line fluidically linked to the fluid return reservoir 412 through the service port 440. For example, a piloted check valve can be used in place of the check valve 416 to permit fluid flow in a single direction, from the low pressure fluid line in fluid communication with the service port 440 to the fluid return reservoir 412. However, when the solenoid valve 418 is in the second stage, fluid pressure from the fluid source 410 can be applied to the pilot port, forcing the piloted check valve open to allow fluid to flow from the fluid return reservoir 412 to the low pressure fluid line in fluid communication with the service port 440. This supplemental fluid flow can take place during the deploy process when fluid recirculation combined with the limited primary fluid flow from the fluid source 410 may be insufficient to meet the fluid draw of the deploy chamber 476 (e.g., the supplemental flow can make up for the imbalance between the stow chamber 478 and the deploy chamber 476). In such examples, the pressure of the deploy chamber 476 can fall below the pressure of the fluid return reservoir 412, which instigates the supplemental fluid flow.

FIG. 4A illustrates the TRAS 400 in an example stow condition, such as may be maintained during use while an aircraft is grounded or in flight. In the stow condition, the TRAS 400 is configured to inhibit fluid flow from the fluid source 410 to the EHSVs 403a-403b, the EHSV 492, and the actuators 402a-402d. Accordingly, solenoid valve 418 is placed in the OFF condition, which causes ICV 414 to remain in the default first stage. As described above, the first stage of the ICV 414 fluidically couples its service port 424 to the low pressure port 420, placing the deploy port 452 in fluid communication with the low pressure of the fluid return reservoir 412. Thus, fluid is allowed to flow from the deploy chamber 476 to the fluid return reservoir 412 to potentially evacuate fluid from the system, while fluid flow from the fluid source to the actuators 402a-402d is prevented.

FIG. 4B illustrates the TRAS 400 in an example over-stow command condition. Here, the solenoid valve 418 is placed in the ON condition, which causes the ICV 414 to transition from its respective first-to-second stage. In the second stage of the ICV 414, the service port 424 is fluidically coupled to the high pressure port 422, placing the actuators 402a-402d, the EHSV 492, and the EHSVs 403a-403b in fluid communication with the pressurized fluid source 410.

The controller 406a commands the EHSV 403a to its stow stage configuration, fluidically connecting the stow chamber 478 to the pressurized fluid source 410 and fluidically connecting the deploy chamber 476 to the fluid return reservoir 412. The controllers 406b and 490 operate in a substantially similar manner as the controller 406a. In the illustrated example configuration, the actuators 402a-402d are urged into their stowed configuration. In some implementations, the TRAS 400 can be put into an over-stow configuration in order to aid in unlocking the actuators 402a-402d in preparation for a commanded deployment (e.g., to unlock an over-center locking mechanism to permit release of an actuator or element, to relieve tension on a retaining pin to allow it to be retracted).

FIG. 4C illustrates the TRAS 400 in an example compressive load stage of a deploy command condition.

Here, the solenoid valve 418 remains in the ON condition, which causes the ICV 414 to remain in its second stage. In the second stage of the ICV 414, the service port 424 is fluidically coupled to the high pressure port 422, placing the EHSVs 403a-403b and 492 in fluid communication with the pressurized fluid source 410.

The DCV 432 is energized and ports hydraulic pressure to the deploy chamber 476 and the stow chamber 478 of the actuators. Since the actuators 402a-402d are "unbalanced" because the piston area exposed to fluid pressure in the deploy chamber 476 is greater than the piston area in the stow chamber 478 (due to the presence of the rod extending through the stow chamber), the greater piston area creates a greater hydraulic force output. As such, when the deploy chamber 476 and the stow chamber 478 are at equal pressure, the actuator rod 470 will be urged downward to deployment. The flow to the deploy chamber 476 and the outflow from the stow chamber 478 is limited by a collection of orifices 480 (e.g., flow regulators).

The position sensors 445*a*-445*d* provide electronic position feedback (e.g., linear or rotary variable displacement transformer signals). Based on the position feedback, the controllers 406*a*-406*b* and 490 can identify positional differentials between the actuators 402*a*-402*d* to determine the output positions of at least the actuators 402*b* and 402*d* and control the EHSVs 403*a*-403*b* and 492 to port hydraulic fluid pressure to augment or retard the velocity of the actuators 402*a*, 402*b*, and 402*c* in order to substantially follow the positions of the actuators 402*b* and/or 402*d*. In some embodiments, the controllers 406*a*-406*b* and 490 can be configured to determine the absolute positions of the actuator outputs of at least the actuators 402*a*-402*d*. In some embodiments, the controllers 406*a*-406*b* and 490 can be configured to determine a relative difference between the positions of the actuator outputs of two or more of the actuators 402*a*-402*d*. Based on the determined positional difference(s), the controllers 406*a*-406*b* and 490 provide a control signal to one or more of the EHSVs 403*a*-403*b* and 492 to control the EHSVs 403*a*-403*b* and 492 to controllably permit and block additional fluid flow from the control ports 497 and 498 through the EHSVs 403*a*-403*b* and 492 to the actuators 402*a*-402*c* to urge substantial synchronization of the output of the actuators 402*a*-402*d* in a closed-loop control configuration.

FIG. 4D illustrates the TRAS 400 in an example fully deployed condition, such as may be maintained during TRAS usage. In the fully deployed condition, the ICU 408 is (optionally) de-energized, causing the ICV 414 and the solenoid valve 418 to return in their default first stages. The first stage of the ICV 414 fluidically couples its service port 424 to the low pressure port 420, placing the deploy chamber 476 in fluid communication with the low pressure of the fluid return reservoir 412. Thus, fluid is allowed to flow from the deploy chamber 476 to the fluid return reservoir 412 to potentially evacuate fluid from the system, while fluid flow from the fluid source to the actuators 402*a*-402*d* and the EHSVs 403*a*-403*b* and 492 is prevented. In some implementations, external tension loads on the actuators 402*a*-402*d* can hold the TRAS 400 in the deploy position. The DCV 432 is energized, and the EHSVs 403*a* and 403*b* are energized to the deploy position.

Figure 4E:
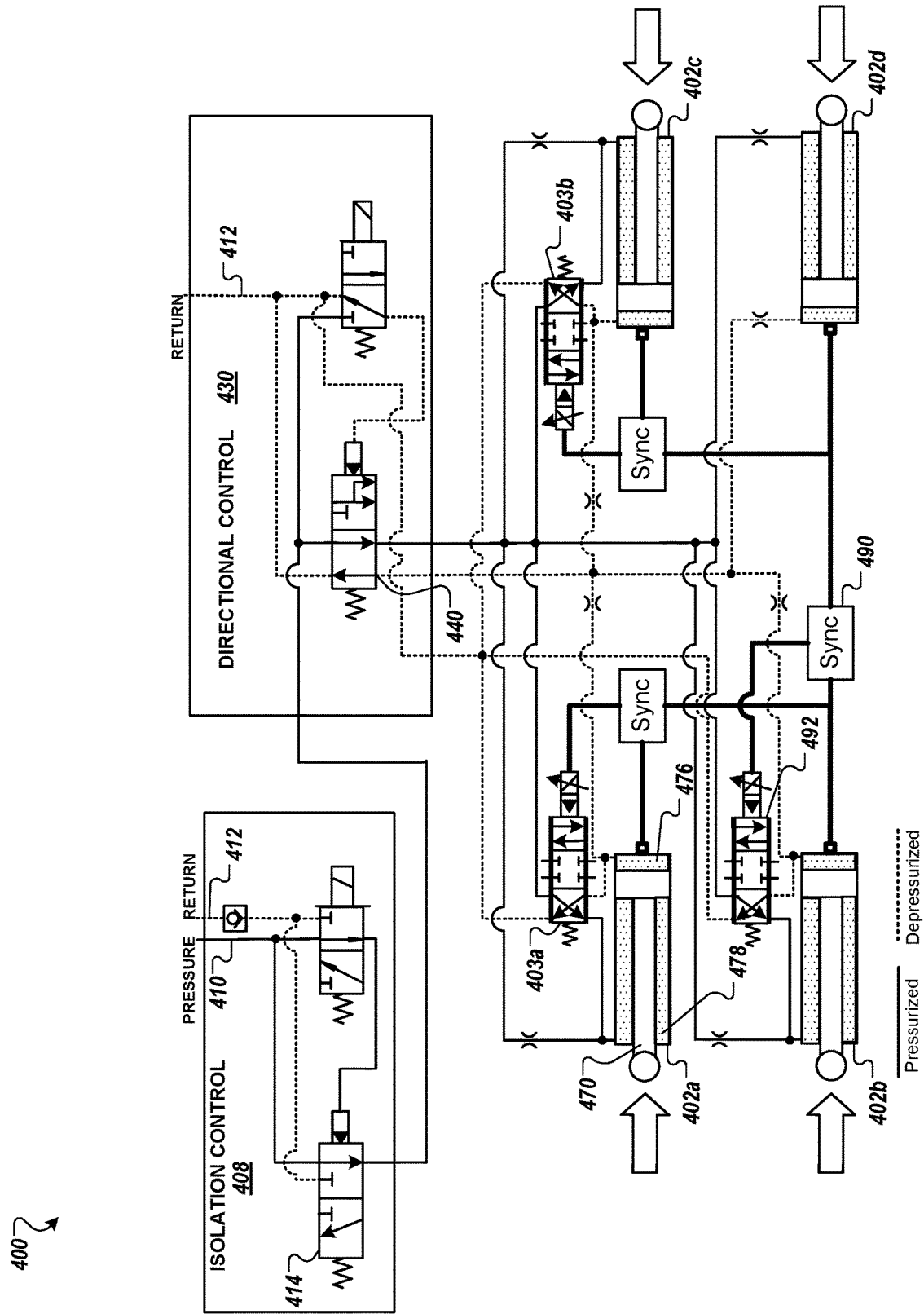

FIG. 4E illustrates the TRAS 400 in an example stow-command condition. The components of the ICU 408 and DCU 430 are operated identically to the over-stow-command condition. Pressurized fluid from the fluid source 410 is directed to the stow chamber 478 of the actuators 402*a*-402*d* to urge retraction of the actuator rods 470. Fluid in the deploy chamber 476 is urged into the service port 440 and toward the fluid return reservoir 412.

In the illustrated example configuration, at least two levels of safety against inadvertent stowing are provided. For example, TRAS 400 is protected against failure of ICV 414 to open, and the TRAS 400 can be protected against the actuators 402*a*-402*d* being falsely commanded to stow.

The use of terminology such as "front," "rear," "top," "bottom," "raised," "lowered," "upwards," and "downwards" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

Figure 5:
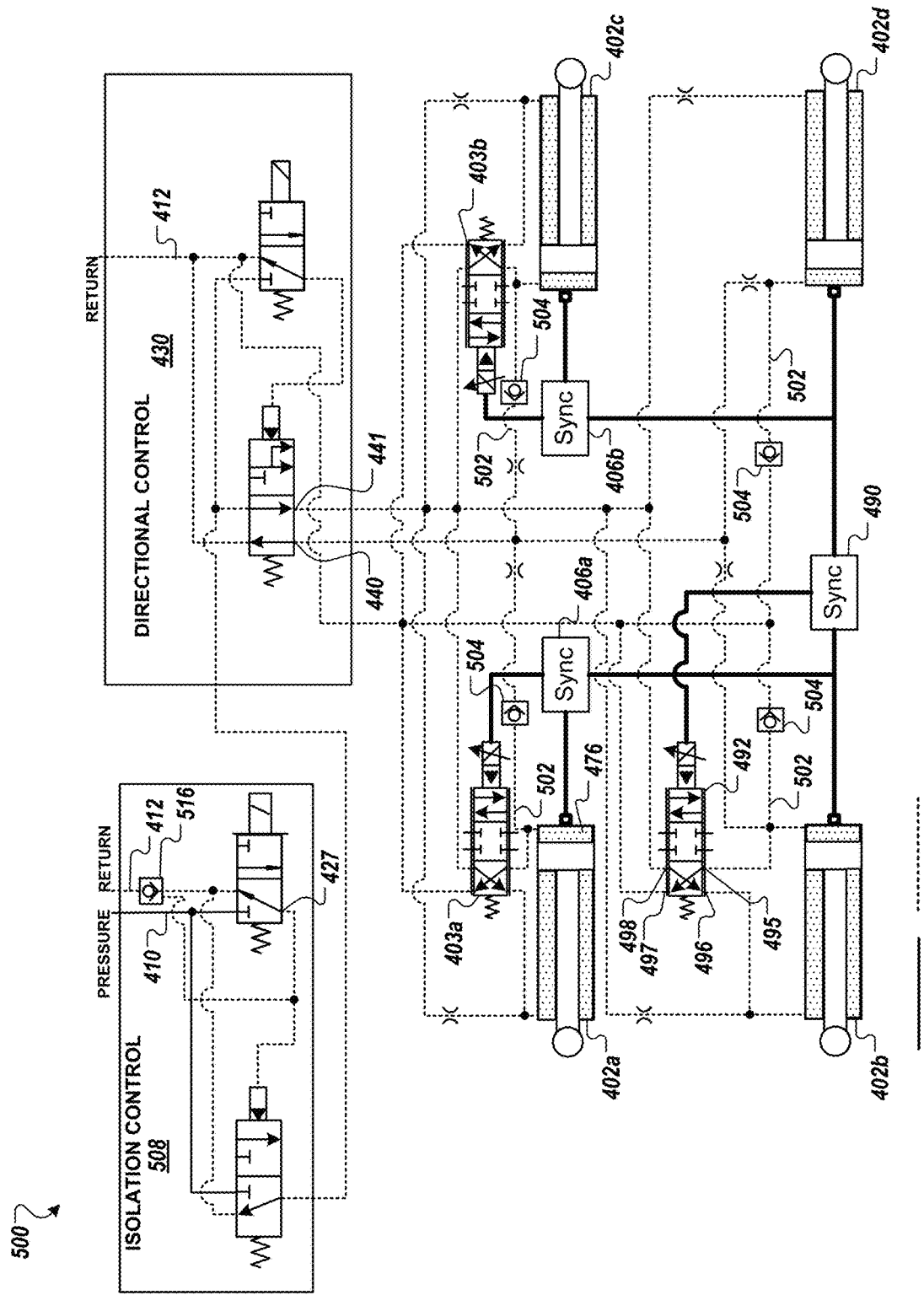
FIG. 5 is a schematic diagram of another example low-flow thrust-reverser actuation system.

FIG. 5 is a schematic diagram of an example low-flow TRAS 500. In some embodiments, the TRAS 500 can be the example TRAS 100 of FIG. 1A-1B. In some embodiments, the TRAS 500 can be a modification of the example TRAS 400 of FIGS. 4A-4E in which at least a portion of fluid flow can be taken from the fluid return reservoir 412 instead of from the fluid source 410 (e.g., hydraulic pump) during tension loads.

The TRAS 500 includes an ICU 508 that is substantially similar to the example ICU 408 of FIGS. 4A-4E, except the check valve 416 is replaced with a piloted check valve 516 configured to receive pilot pressure from the actuator port 427 and selectively allow fluid from the fluid return reservoir 412 to backflow.

In the illustrated embodiment, the EHSVs 403*a*-403*b* and 492 are configured to control the actuators 402*a*, 402*b*, and 402*c* to follow the actuators 402*b* and/or 402*d*, in substantially the same way as in the example TRAS 400. A bypass fluid line 502 puts the deploy chamber 476 in fluid communication with the fluid return reservoir 412. A check valve 504 (e.g., an anti-cavitation check valve) acts as a fluidic diode, permitting fluid flow through the bypass fluid line 502 in a single direction, from the fluid return reservoir 412 to the deploy chamber 476, while blocking fluid flow in the opposite direction, from the deploy chamber 476 to the fluid return reservoir 412.

In the illustrated example, the actuators 402*a*-402*d* will function substantially the same as in the examples described in FIGS. 4A-4E. The difference in the example TRAS 500 is that during mid-deployment (e.g., at a point between the configurations described for FIGS. 4B and 4C), the thrust-reversing elements that are being actuated by the actuators 402*a*-402*d* (e.g., the thrust-reversing elements 24*a* and 24*b*) can catch wind resistance as they open. This wind resistance can create a large tension load that can urge the actuators 402*a*-402*d* to deploy, drawing the deploy chamber 476 open faster than the fluid source 410 can supply fluid to backfill the demand. In such examples, the fluid pressure at the deploy chamber 476 side of the bypass fluid line 502 will be at a lower pressure than the fluid return reservoir 412, causing the check valve 504 to open and permit fluid from the fluid return reservoir 412 to be drawn into the deploy chamber 476. The EHSVs 403*a*, 403*b*, and 492 can be controlled to substantially synchronize the motions of the actuators 402*a*, 402*b*, and 402*c* with the motions of their respectively paired actuators 402*b* and/or 402*d*. The piloted check valve 516 receives pilot pressure from the actuator port 427, which opens the piloted check valve 516 to permit additional fluid from the fluid return reservoir 412 to the actuators 402*a*-402*d* to make up for any volumetric fluid deficits that might occur due to the structure of the actuators 402*a*-402*d* as they operate.

In some embodiments, additional flow control components (e.g., controllable valves, flow restrictors) can be added along the bypass fluid line 502 to control the rate at which fluid can be drawn from the fluid return reservoir 412 (e.g., to control deployment speed, to provide additional safety against inadvertent deployment due to aiding forces).

Figure 6:
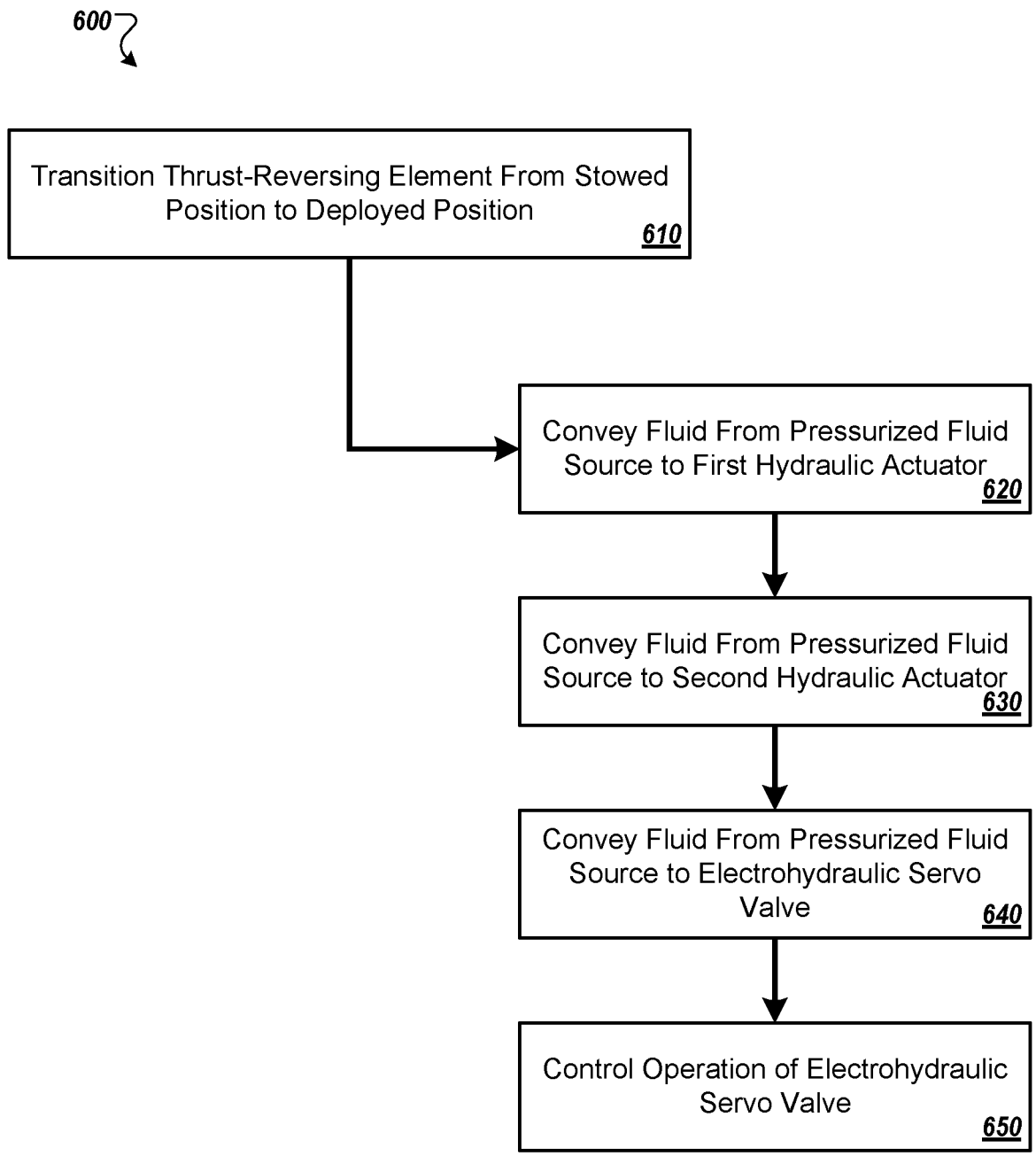
FIG. 6 is a flow diagram of an example process for operating a thrust reverser actuation system.

FIG. 6 is a flow diagram of an example process 600 for operating an engine thrust reverser comprising a thrust-reversing element movable between a stowed position and a deployed position. In some implementations, the process 600 can be used with the example TRAS 200 or 300 of FIGS. 2A-3.

At 610, the thrust-reversing element is transitioned from the stowed position to the deployed position. The transition is performed through the following actions.

At 620, fluid is conveyed from a pressurized fluid source to a first hydraulic actuator coupled to the thrust-reversing element. For example, fluid can be conveyed from the fluid source 210 to the actuator 202b.

At 630, fluid is conveyed from the pressurized fluid source to a second hydraulic actuator coupled to the thrust-reversing element. For example, fluid can be conveyed from the fluid source 210 to the actuator 202a.

At 640, fluid is conveyed from the pressurized fluid source to an electrohydraulic servo valve operable to selectively route fluid between the pressurized fluid source, the second hydraulic actuator, and a fluid return reservoir. For example, fluid can be conveyed from the fluid source 210 to the EHSV 203a.

At 650, a controller controls operation of the electrohydraulic servo valve. For example, the controller 206a is configured to control operation of the actuator 202a by controlling, based on feedback from the sensors 245a-245b, additional flow of fluid from the fluid source 210 to the actuator 202a, and/or additional flow of fluid from the actuator 202a to the fluid return reservoir 212.

In some implementations, the process 600 can include controlling, by the controller, operation of the electrohydraulic servo valve such that a second mechanical output of the second hydraulic actuator is urged toward positional synchronicity with a first mechanical output the first hydraulic actuator. For example, the controller 206a can use positional feedback from the sensors 245a-245b in a closed-loop feedback control arrangement to cause the positional output of the actuator 202a to substantially mirror the positional output of the actuator 202b.

In some implementations, the process 600 can include selectively routing, by a second electrohydraulic servo valve, fluid between the pressurized fluid source, the first hydraulic actuator, the second hydraulic actuator, the electrohydraulic servo valve, and the fluid return reservoir. For example, the DCV 232 can be actuated to control the overall direction of fluid flow to/from the actuators 202a-202b and the overall direction of deployment of the element to which they are coupled (e.g., the example thrust-reversing element 24a of FIGS. 1A and 1B).

In some implementations, the first hydraulic actuator, the second hydraulic actuator, and the electrohydraulic servo valve can be fluidically connected in parallel between the pressurized fluid source and the fluid return reservoir. For example, the actuator 202a, the actuator 202b, and the EHSV 203a are each in parallel fluid communication with the fluid source 210, and the actuator 202a, the actuator 202b, and the EHSV 203a are each in parallel fluid communication with the fluid return reservoir 212.

In some implementations, the process 600 can include operating an isolation control unit including an isolation control valve to selectively inhibit or permit fluid flow between the electrohydraulic servo valve, the pressurized fluid source, and the fluid return reservoir. For example, when the ICV 214 is in the first stage, the DCU 230 is placed in fluid communication with the fluid return reservoir 212, and when the ICV 214 is in the second stage, the DCU 230 is placed in fluid communication with the fluid source 210. The default stage of the ICV 214 is the first stage, which inhibits fluid flow into the DCU 230 for fire protection purposes.

In some implementations, conveying fluid from the pressurized fluid source to the electrohydraulic servo valve can include conveying fluid from the pressurized fluid source to the electrohydraulic servo valve in parallel with conveying fluid from the pressurized fluid source to the first hydraulic actuator, where the first hydraulic actuator and the electrohydraulic servo valve are fluidically connected in parallel between the pressurized fluid source and the fluid return reservoir. For example, fluid can flow from the fluid source 210 to the deploy chamber 276 of the actuator 202a, the deploy chamber 276 of the actuator 202b, and to the EHSV 203a substantially independently, substantially simultaneously, and substantially in fluidic parallelism to each other.

In some implementations, the process 600 can include permitting, by a first anti-cavitation check valve residing on a first bypass fluid line providing fluid communication between the first hydraulic actuator and the fluid return reservoir independent of the electrohydraulic servo valve, fluid flow from the fluid return reservoir to the hydraulic actuator. In some implementations, the process 600 can include inhibiting, by the first anti-cavitation check valve, fluid flow from the hydraulic actuator to the fluid return reservoir, permitting, by a second anti-cavitation check valve residing on a second bypass fluid line providing fluid communication between the second hydraulic actuator and the fluid return reservoir independent of the electrohydraulic servo valve, fluid flow from the fluid return reservoir to the hydraulic actuator. In some implementations, the process 600 can include inhibiting, by the second anti-cavitation check valve, fluid flow from the second hydraulic actuator to the fluid return reservoir. For example, the example TRAS 300 includes the check valves 304 to prevent fluid flow from the deploy chamber 276 to the fluid return reservoir 212, and permit fluid flow from the fluid return reservoir 212 to the deploy chamber 276.

Figure 7:
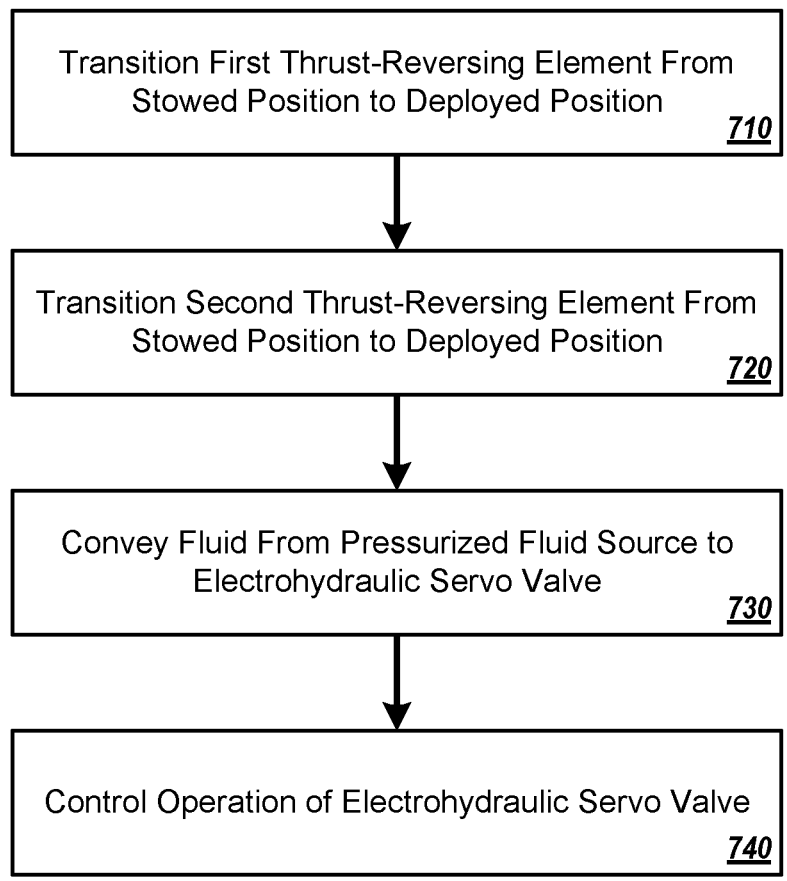
FIG. 7 is a flow diagram of another example process for operating a thrust reverser actuation system.

FIG. 7 is a flow diagram of another example process 700 for operating a first thrust-reversing element movable between a first stowed position and a first deployed position and a second thrust-reversing element movable between a second stowed position and a second deployed position. In some implementations, the process 700 can be used with the example TRAS 400 or 500 of FIGS. 4A-5.

At 710, the first thrust-reversing element is transitioned from the first stowed position to the first deployed position by conveying fluid from a pressurized fluid source to a first hydraulic actuator coupled to the first thrust-reversing element. For example, fluid can be conveyed from the example fluid source 410 to the example actuator 402b.

At 720, the second thrust-reversing element is transitioned from the second stowed position to the second deployed position by conveying fluid from the pressurized fluid source to a second hydraulic actuator coupled to the second thrust-reversing element. For example, fluid can be conveyed from the example fluid source 410 to the example actuator 402d.

At 730, fluid is conveyed from the pressurized fluid source to an electrohydraulic servo valve operable to selectively route fluid between the pressurized fluid source, the first hydraulic actuator, and a fluid return reservoir. For example, fluid can be conveyed from the example fluid source 410 to the example EHSV 492.

At 740, a controller controls operation of the electrohydraulic servo valve. For example, the example controller 490 can control the example EHSV 492, based on feedback from the sensors 445b and 445d, to control additional flow of fluid from the fluid source 410 to the actuator 402b, and/or additional flow of fluid from the actuator 402b to the fluid return reservoir 412.

In some implementations, the process 700 can include controlling, by the controller, operation of the electrohydraulic servo valve such that a first mechanical output of the first hydraulic actuator is urged toward positional synchronicity with a second mechanical output the second hydraulic actuator. For example, the example controller 490 can use positional feedback from the example sensor 445b and/or the example sensor 445d in a closed-loop feedback control arrangement to cause the positional output of the example actuator 402b to substantially mirror the positional output of the example actuator 402d.

In some implementations, the process 700 can include selectively routing, by a second electrohydraulic servo valve, fluid between the pressurized fluid source, the first hydraulic actuator, the second hydraulic actuator, the electrohydraulic servo valve, and the fluid return reservoir. For example, the example DCV 432 can be actuated to control the overall direction of fluid flow to/from the example actuators 402a-402d and the overall direction of deployment of the element to which they are coupled (e.g., the example thrust-reversing element 24a of FIGS. 1A and 1B).

In some implementations, the first hydraulic actuator, the second hydraulic actuator, and the electrohydraulic servo valve can be fluidically connected in parallel between the pressurized fluid source and the fluid return reservoir. For example, the example actuator 402b, the example actuator 402d, and the example EHSV 492 are each in parallel fluid communication with the example fluid source 410, and the example actuator 402b, the example actuator 402d, and the example EHSV 492 are each in parallel fluid communication with the example fluid return reservoir 412.

In some implementations, the process 700 can include operating an isolation control unit including an isolation control valve to selectively inhibit or permit fluid flow between the electrohydraulic servo valve, the pressurized fluid source, and the fluid return reservoir. For example, when the ICV 414 is in the first stage, the DCU 430 is placed in fluid communication with the fluid return reservoir 412, and when the ICV 414 is in the second stage, the DCU 430 is placed in fluid communication with the fluid source 410. The default stage of the ICV 414 is the first stage, which inhibits fluid flow into the DCU 430 for fire protection purposes.

In some implementations, transitioning the first thrust-reversing element from the first stowed position to the first deployed position can include conveying fluid from a pressurized fluid source to a third hydraulic actuator coupled to the first thrust-reversing element and conveying fluid from the pressurized fluid source to another electrohydraulic servo valve operable to selectively route fluid between the pressurized fluid source, the third hydraulic actuator, and a fluid return reservoir. In some implementations, conveying fluid from the pressurized fluid source to the other electrohydraulic servo valve can include conveying fluid from the pressurized fluid source to the other electrohydraulic servo valve in parallel with conveying fluid from the pressurized fluid source to the first hydraulic actuator, the second hydraulic actuator, the third hydraulic actuator, and the electrohydraulic servo valve, where the first hydraulic actuator, the second hydraulic actuator, the third hydraulic actuator, the electrohydraulic servo valve, and the other electrohydraulic servo valve are fluidically connected in parallel between the pressurized fluid source and the fluid return reservoir. For example, the example actuator 402a can be supplied with fluid to actuate the example actuator rod 470. In some implementations, the process 700 can include controlling, by another controller, operation of the other electrohydraulic servo valve such that a first mechanical output of the third hydraulic actuator is urged toward positional synchronicity with a second mechanical output the first hydraulic actuator. For example, the example controller 406a can use position feedback signals from the example sensors 445a and 445b to control the example EHSV 403a. In another example, the example controller 406b can use position feedback signals from the example sensors 445c and 445d to control the example EHSV 403b.

In some implementations, conveying fluid from the pressurized fluid source to the electrohydraulic servo valve can include conveying fluid from the pressurized fluid source to the electrohydraulic servo valve in parallel with conveying fluid from the pressurized fluid source to the first hydraulic actuator and the second hydraulic actuator, wherein the first hydraulic actuator, the second hydraulic actuator, and the electrohydraulic servo valve are fluidically connected in parallel between the pressurized fluid source and the fluid return reservoir. For example, each of the example actuator 402a, the example 402b, the example EHSV 403a and the example EHSV 492 can be in independent, parallel fluid communication with the example fluid source 410 and the example fluid return reservoir 412.

In some implementations, the process 700 can include permitting, by an anti-cavitation check valve residing on a bypass fluid line providing fluid communication between at least one of the first hydraulic actuator and the second hydraulic actuator and the fluid return reservoir independent of the electrohydraulic servo valve, fluid flow from the fluid return reservoir to the at least one of the first hydraulic actuator and the second hydraulic actuator, and inhibiting, by the anti-cavitation check valve, fluid flow from the at least one of the first hydraulic actuator and the second hydraulic actuator to the fluid return reservoir. For example, the example TRAS 500 includes the example check valves 504 to prevent fluid flow from the example deploy chamber 476 to the example fluid return reservoir 412, and permit fluid flow from the example fluid return reservoir 412 to the example deploy chamber 476.

Figure 8:
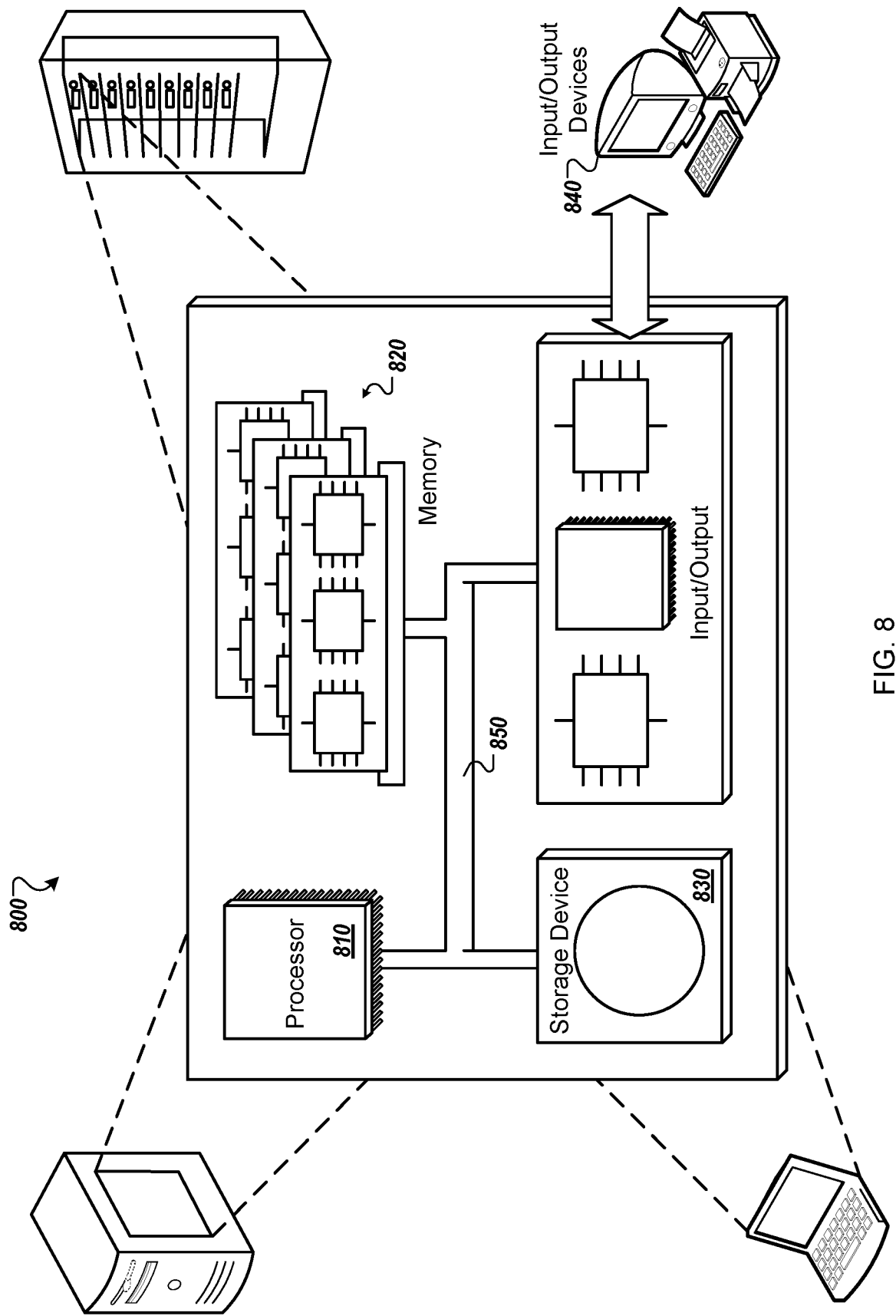
FIG. 8 is a schematic diagram of an example of a generic computer system 800.

FIG. 8 is a schematic diagram of an example of a generic computer system 800. The system 800 can be used for the operations described in association with the method 300 according to one implementation. For example, the system 800 may be included in either or all of the example controllers 206a, 206b, 406a, 406b, and 490.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An engine assembly, comprising:
    a nacelle configured to at least partially surround an engine; and
    a thrust reverser coupled to the nacelle, the thrust reverser comprising:
    a thrust-reversing element movable relative to the nacelle between a stowed position and a deployed position;
    a first hydraulic actuator operably coupled to move the thrust-reversing element between the stowed position and the deployed position, the first hydraulic actuator being fluidically connected to a pressurized fluid source and a fluid return reservoir; and
    a second hydraulic actuator operably coupled to move the thrust-reversing element between the stowed position and the deployed position, the second hydraulic actuator being fluidically connected to the pressurized fluid source and the fluid return reservoir;
    a fluid control system comprising:
    an electrohydraulic servo valve operable to selectively route fluid between the pressurized fluid source, the second hydraulic actuator, and the fluid return reservoir; and
    a controller configured to operate the electrohydraulic servo valve; and
    a directional control valve operable to selectively route fluid between the pressurized fluid source, the first hydraulic actuator, the second hydraulic actuator, the electrohydraulic servo valve, and the fluid return reservoir;
    wherein the first hydraulic actuator, the second hydraulic actuator, and the electrohydraulic servo valve are fluidically connected in parallel between the pressurized fluid source and the fluid return reservoir.

2. The engine assembly of claim 1, wherein the controller is configured to operate the electrohydraulic servo valve such that a second mechanical output of the second hydraulic actuator is urged toward positional synchronicity with a first mechanical output of the first hydraulic actuator.

3. The engine assembly of claim 1, wherein the fluid control system further comprises an isolation control unit including an isolation control valve operable to selectively inhibit or permit fluid flow between the directional control valve, the pressurized fluid source, and the fluid return reservoir.

4. The engine assembly of claim 1, wherein the fluid control system further comprises:
    a first anti-cavitation check valve residing on a first return fluid line in fluidic communication with the fluid return reservoir, the first anti-cavitation check valve configured to permit fluid flow from the fluid return reservoir to the first hydraulic actuator, while inhibiting fluid flow from the first hydraulic actuator to the fluid return reservoir; and a second anti-cavitation check valve residing on a second return fluid line in fluidic communication with the fluid return reservoir, the second anti-cavitation check valve configured to permit fluid flow from the fluid return reservoir to the second hydraulic actuator, while inhibiting fluid flow from the second hydraulic actuator to the fluid return reservoir.

5. The engine assembly of claim 1, further comprising a first position sensor configured to provide a first position feedback signal representative of a position of a first mechanical output of the first hydraulic actuator, wherein the controller is configured to operate the electrohydraulic servo valve based on the first position feedback signal.

6. The engine assembly of claim 5, further comprising a second position sensor configured to provide a second position feedback signal representative of a position of a second mechanical output of the second hydraulic actuator, wherein the controller is configured to operate the electrohydraulic servo valve based on the first position feedback signal and the second position feedback signal.

7. A fluid control system configured to operate a first hydraulic actuator coupled to a thrust-reversing element coupled to a nacelle of an engine assembly and a second hydraulic actuator coupled to the thrust-reversing element, the fluid control system comprising:
an electrohydraulic servo valve operable to selectively route fluid between a pressurized fluid source, the second hydraulic actuator, and a fluid return reservoir;
a directional control valve operable to selectively route fluid between the pressurized fluid source, the first hydraulic actuator, the second hydraulic actuator, the electrohydraulic servo valve, and the fluid return reservoir; and
a controller configured to operate the electrohydraulic servo valve, wherein the first hydraulic actuator, the second hydraulic actuator, the directional control valve, and the electrohydraulic servo valve are fluidically connected to the pressurized fluid source and the fluid return reservoir;
wherein the first hydraulic actuator, the second hydraulic actuator, and the electrohydraulic servo valve are fluidically connected in parallel between the pressurized fluid source and the fluid return reservoir.

8. The fluid control system of claim 7, wherein the controller is configured to operate the electrohydraulic servo valve such that a second mechanical output of the second hydraulic actuator is urged toward positional synchronicity with a first mechanical output of the first hydraulic actuator.

9. The fluid control system of claim 7, wherein the fluid control system further comprises an isolation control unit including an isolation control valve operable to selectively inhibit or permit fluid flow between the directional control valve, the pressurized fluid source, and the fluid return reservoir.

10. The fluid control system of claim 7, further comprising:
a first anti-cavitation check valve residing on a first return fluid line in fluidic communication with the fluid return reservoir, the first anti-cavitation check valve configured to permit fluid flow from the fluid return reservoir to the first hydraulic actuator, while inhibiting fluid flow from the first hydraulic actuator to the fluid return reservoir; and a second anti-cavitation check valve residing on a second return fluid line in fluidic communication with the fluid return reservoir, the second anti-cavitation check valve configured to permit fluid flow from the fluid return reservoir to the second hydraulic actuator, while inhibiting fluid flow from the second hydraulic actuator to the fluid return reservoir.

11. The fluid control system of claim 7, further comprising a first position sensor configured to provide a first position feedback signal representative of a position of a first mechanical output of the first hydraulic actuator, wherein the controller is configured to operate the electrohydraulic servo valve based on the first position feedback signal.

12. The fluid control system of claim 11, further comprising a second position sensor configured to provide a second position feedback signal representative of a position of a second mechanical output of the second hydraulic actuator, wherein the controller is configured to operate the electrohydraulic servo valve based on the first position feedback signal and the second position feedback signal.

13. A method of operating an engine thrust reverser comprising a thrust-reversing element movable between a stowed position and a deployed position, the method comprising:
transitioning the thrust-reversing element from the stowed position to the deployed position by:
comprising selectively routing, by a directional control valve, fluid between a pressurized fluid source, a first hydraulic actuator, a second hydraulic actuator, an electrohydraulic servo valve, and a fluid return reservoir;
conveying fluid from the directional control valve to the first hydraulic actuator coupled to the thrust-reversing element;
conveying fluid from the directional control valve to the second hydraulic actuator coupled to the thrust-reversing element;
conveying fluid from the directional control valve to the electrohydraulic servo valve, wherein the electrohydraulic servo valve is operable to selectively route fluid between the directional control valve and the second hydraulic actuator; and
controlling, by a controller, operation of the electrohydraulic servo valve;
wherein the first hydraulic actuator, the second hydraulic actuator, and the electrohydraulic servo valve are fluidically connected in parallel between the pressurized fluid source and the fluid return reservoir.

14. The method of claim 13, further comprising controlling, by the controller, operation of the electrohydraulic servo valve such that a second mechanical output of the second hydraulic actuator is urged toward positional synchronicity with a first mechanical output of the first hydraulic actuator.

15. The method of claim 13, further comprising operating an isolation control unit including an isolation control valve to selectively inhibit or permit fluid flow between the electrohydraulic servo valve, the pressurized fluid source, and the fluid return reservoir.

16. The method of claim 13, wherein conveying fluid from the pressurized fluid source to the electrohydraulic servo valve further comprises conveying fluid from the pressurized fluid source to the electrohydraulic servo valve in parallel with conveying fluid from the pressurized fluid source to the first hydraulic actuator, wherein the first hydraulic actuator and the electrohydraulic servo valve are fluidically connected in parallel between the pressurized fluid source and the fluid return reservoir.

17. The method of claim 13, further comprising:
permitting, by a first anti-cavitation check valve residing on a first bypass fluid line providing fluid communication between the first hydraulic actuator and the fluid return reservoir independent of the electrohydraulic servo valve, fluid flow from the fluid return reservoir to the first hydraulic actuator;
inhibiting, by the first anti-cavitation check valve, fluid flow from the first hydraulic actuator to the fluid return reservoir;
permitting, by a second anti-cavitation check valve residing on a second bypass fluid line providing fluid communication between the second hydraulic actuator and the fluid return reservoir independent of the electrohydraulic servo valve, fluid flow from the fluid return reservoir to the second hydraulic actuator; and
inhibiting, by the second anti-cavitation check valve, fluid flow from the second hydraulic actuator to the fluid return reservoir.

* * * * *